(12) United States Patent
Poris

(10) Patent No.: US 6,657,216 B1
(45) Date of Patent: Dec. 2, 2003

(54) DUAL SPOT CONFOCAL DISPLACEMENT SENSOR

(75) Inventor: Jaime Poris, Boulder Creek, CA (US)

(73) Assignee: Nanometrics Incorporated, Milpitas, CA (US)

( * ) Notice: Subject to any disclaimer, the term of this patent is extended or adjusted under 35 U.S.C. 154(b) by 0 days.

(21) Appl. No.: 10/173,726

(22) Filed: Jun. 17, 2002

(51) Int. Cl.[7] .............................................. G01N 21/86

(52) U.S. Cl. .................................. 250/559.22; 250/216

(58) Field of Search ........................... 250/559.22, 216, 250/559.4, 559.44, 221; 356/239.1, 239.7, 238.1, 237.4–237.6; 436/518

(56) References Cited

U.S. PATENT DOCUMENTS

| | | | |
|---|---|---|---|
| 3,013,467 A | 12/1961 | Minsky | 88/14 |
| 5,304,810 A | 4/1994 | Amos | 250/458.1 |
| 6,458,601 B1 * | 10/2002 | Kimura | 436/518 |

OTHER PUBLICATIONS

Wang, F., et al., "The optical probe using differential confocal technique for surface profile", Proc. Of SPIE, Process Control and Inspection for Industry, vol. 4222 (2000), pp. 194–197. (No Date).

* cited by examiner

*Primary Examiner*—Que T. Le
(74) *Attorney, Agent, or Firm*—Silicon Valley Patent Group LLP

(57) ABSTRACT

A confocal displacement sensor uses one or two light sources and produces two spots on a sample surface. The reflected intensities from the two spots are detected and measured by one or two detectors. A vertical resolution enhancement can be implemented by modifying the properties of the objective and/or detector lenses. The resultant height profile does not need to be corrected for tilt as is common with all single point surface measurement techniques. A differential scan can be performed with the two spots relatively close together to generate the slope of the height profile. Integrating this profile yields the height profile of the scan. A referential scan can be performed by scanning the reference point across an area of constant height and the measurement point scanned across the feature to be measured to directly generate the height profile.

62 Claims, 13 Drawing Sheets

DUAL SPOT CONFOCAL DISPLACEMENT SENSOR

FIELD OF THE INVENTION

The present invention relates to the measuring of the profile of a surface and in particular to measuring a profile using a confocal displacement sensor.

BACKGROUND

There are a multitude of applications where it is desirable to measure surface properties of a sample. The roughness of the surface, the curvature of the surface and the height of steps on the surface are typical application examples. Many diverse technologies can be employed to accomplish this metrology task. Common examples of devices include a contact profilometer, an atomic force microscope (AFM), a laser confocal displacement sensor, a laser triangulation displacement sensor, and a differential interferometer.

Each technology has advantages and disadvantages with respect to specific parameters, including vertical resolution, lateral resolution, maximum step size, and surface feature geometry. Other factors that determine the usefulness of a particular technology for a specific application include maximum measurement time, non-contact requirement, tilt correction, and material properties.

The principles associated with a confocal microscope as used in conventional laser confocal displacement sensors are described in U.S. Pat. No. 3,013,467, which is incorporated herein by reference. The basic principal of the confocal displacement sensor involves rejecting a large fraction of the light that is not in the focal plane of the surface of the sample, thereby increasing the contrast and resolution of the resultant image. One typical commercial version of a laser confocal displacement sensor is sold as the LT series by Keyence Corporation of America, located in Woodcliff Lake, N.J.

FIG. 1 is a block diagram of a conventional laser confocal displacement sensor 10 that is used to measure the surface of a sample 30. A laser 20 produces a beam of light that is focused by objective lens 32 onto the surface of sample 30. The beam strikes the surface of sample 30 at normal incidence.

After reflection from the surface of the sample 30 and transmission through objective lens 32, a fraction of the beam is reflected by beamsplitter 35 toward detector 60. Between detector 60 and beamsplitter 35 are a detector lens 40 and a pinhole 50. The focal plane of the objective lens 32 and the focal plane of the detector lens 40 (the plane of the pinhole 50) are made to be confocal. Typically, the objective lens 32 is scanned orthogonally with respect to the plane of the sample 30 over a range exceeding the expected step size on the surface of the sample using a piezoelectric or voice coil driver 36. An encoder associated with piezoelectric or voice coil driver 36 allows the determination of the position of the objective lens at any given time.

FIG. 2 shows a typical plot of the position of the objective lens along the X axis versus the measured detector signal intensity along the Y axis. The detector signal reaches a maximum when the beam is focused on the sample surface (and the pinhole) shown in FIG. 2 as position B. The detector signal falls off when the focal plane of the objective lens 32 is above or below the sample surface, shown as positions A and C in FIG. 2.

To make a measurement at one point on the surface of the sample 30, as shown in FIG. 1, the intensity measured by the detector 60 is recorded along with the position of the objective lens 32. The position of the lens 32 at the maximum detector intensity is determined and yields the relative height of the surface of the sample 30 at that measurement position. Two-point, line scans and area scans can be executed yielding the step height, line profile or area profile of a portion of the surface of the sample 30 by performing the measurement technique at a plurality of positions.

To obtain a more accurate and precise measurement using a standard laser confocal displacement sensor, the resultant height profile must be corrected for tilt. For example, if two points are measured, the tilt of the sample 30 can affect the height difference between the two points. To compensate for tilt, a plurality of positions located on a line through the two measurement points with the same height are measured, and the tilt of sample 30 with respect to the detector is calculated. The determined tilt is then used to correct (level) the measured height profile. The step height can then be calculated with improved accuracy and precision.

In addition, mechanical vibrations that cause a displacement of the sensor with respect to the sample surface will cause an error in the resultant height profile. Low frequency mechanical vibrations are common and can cause considerable measurement error. Minimizing this error source may require an expensive and specialized environment for the sensor. If the vibrations are originating from a process tool, isolation may be even more difficult. Another source of error is any vertical motion of the stage as it moves horizontally to translate the sample to another measurement location, especially if the measurement is made while the stage is moving. This will become a problem as the step height to be measured gets closer in magnitude to the vertical stage error.

An enhancement to the standard laser confocal displacement sensor is described in "The Optical Probe Using Differential Confocal Technique for Surface Profile" by Wang, Fusheng, Tan, Jiubin and Zhao, Weiquan in Process Control and Inspection for Industry, Shulian, Wei Gao, Editors, Proceedings of SPIE vol. 4222 (2000), which is incorporated herein by reference. The enhanced laser confocal displacement sensor uses two unique sensors to receive the reflected signal. The light is reflected from a single point on the surface of the sample. The pinhole of the first detector is made to be a specific distance ahead of the confocal position while the pinhole of the second detector is made to be the same specific distance behind the confocal position. The difference between the two resultant detector intensity versus focal plane position curves yields a curve with a steep slope at the zero crossover point. The focal plane position at the zero crossover point indicates the height of the surface of the sample. The steeper the slope of the curve at this point, the better the resolution capability. As with the displacement sensor 10, shown in FIG. 1, the resultant height profile must be corrected for tilt and is subject to error caused by vibration.

What is needed is a displacement sensor that can accurately measure the surface profile of a sample without the need to correct for tilt and that is relatively insensitive to vibration errors.

SUMMARY

A confocal displacement sensor in accordance with the present invention uses one or two laser wavelengths and produces two spots on a sample surface. The reflected intensities from the two spots are detected and measured after passing through one or more pinholes. Since the focal plane of the objective lens when focused on the sample surface and the focal plane of the detector lens (the plane of the pinhole) are confocal, the maximum detector intensity corresponds to the height of the surface for that point. This is done for both spots at each measurement location.

The resultant height profile advantageously does not need to be corrected for tilt as is common with all single point surface measurement techniques. A differential scan can be performed with the two spots relatively close together to generate the slope of the height profile. Integrating this profile yields the height profile of the scan. A referential scan can be performed by scanning the reference point across an area of constant height and the measurement point scanned across the feature to be measured to directly generate the height profile.

In accordance with one embodiment, the confocal displacement sensor includes at least one light source and a means for producing a first light beam and a second light beam. The displacement sensor also includes an objective lens for focusing the first light beam and the second light beam so that the beams are reflected by the surface of the sample. The displacement sensor includes a detector leg that receives the reflected first light beam and the reflected second light beam. The detector leg includes at least one detector lens and at least one detector and pinhole in the in the optical path of each reflected light beam. In one embodiment, two detectors and two pinholes are used. The at least one detector lens may have an opaque center portion.

A driver is coupled to one or more of the optical components to vary the focal planes of the one or more optical components so that it coincides with the surface of the sample. An encoder allows the precise measurement of the position of the one or more optical components. The position of maximum detector signal indicates the height of the surface at that location. For example, the driver may be coupled to the objective lens, both detector lenses or both pinholes.

A computer system is coupled to the detectors, the driver and the encoder and includes a computer-usable medium having computer-readable program code embodied therein for correlating and recording the intensities recorded by said first detector and said second detector over the range of positions of the driver and for calculating the height difference between the first spot and the second spot.

The means for producing a first light beam and a second light beam may include, e.g., two separate light sources that produce separate light beams that are made coincident by a beamsplitter or by fiber optic components. The coincident beams are then split using an optical component such as a Wollaston prism. The means for producing a first light beam and a second light beam may also be two light sources that produce two light beams that are not parallel. Alternatively, a single light source may produce a single light beam that is polarized and split by, e.g., a Wollaston prism.

A method of measuring the surface profile of a sample, includes producing a first light beam and a second light beam and focusing the light beams on the surface of the sample with an objective lens so that the first light beam and the second light beam are reflected off the surface of the sample. The reflected light beams are focused onto one or more detectors through one or more pinholes. A portion of the reflected light beams may be partially obscured prior to the reflected light being incident on the detectors. The focal plane of the objective lens is varied over a range, wherein the objective lens is confocal with the first pinhole and the second pinhole within that range. The relative height associated with the maximum intensity of each detector is determined. The maximum intensity represents the height of the surface of the sample where the first light beam and the second light beam are incident on the surface.

A first height difference between where the first light beam and the second light beam are incident on the surface is then determined based on the maximum intensities detected by the detectors. The sample can then be repositioned and the method repeated for the new position until a second height difference is calculated. The difference between the first height difference the second height difference can then be calculated to determine the surface profile of the sample. This difference is insensitive to any tilt of the sample with respect to the measurement tool and is relatively insensitive to vibrations.

DETAILED DESCRIPTION

A laser confocal displacement sensor uses two spots in accordance with the present invention. The displacement sensor of the present invention uses a light source, and in one embodiment, two light sources with different wavelengths, to generate two spots on the sample surface. Both spots are analyzed simultaneously and provide an enhanced precision compared to a conventional laser confocal displacement sensor and eliminate the need to level the resultant height profile. Moreover, the measurement is relatively immune to vibrations. The displacement sensor and the associated procedures of using the displacement sensor require the stage and sample to be translated with respect to the sensor or the sensor to be translated with respect to the sample and stage.

The displacement sensor of the present invention can be used in a stand-alone metrology tool or in an integrated metrology module where it is integrated into an appropriate process tool. Process tool examples include a semiconductor copper CMP tool, a semiconductor dielectric CMP tool, a laser etching tool and an abrasive water jet etching tool.

An integrated metrology module tool can improve the performance and cost of ownership of a process tool by reducing the time between the metrology measurement and the processing of subsequent samples allowing the optimization of the process tool parameters. An integrated metrology module also identifies improperly processed samples immediately after processing reducing the number of potential scrapped samples and can be used to improve the precision capability of a process tool with an optimized processing and measurement sequence.

Figure 1:
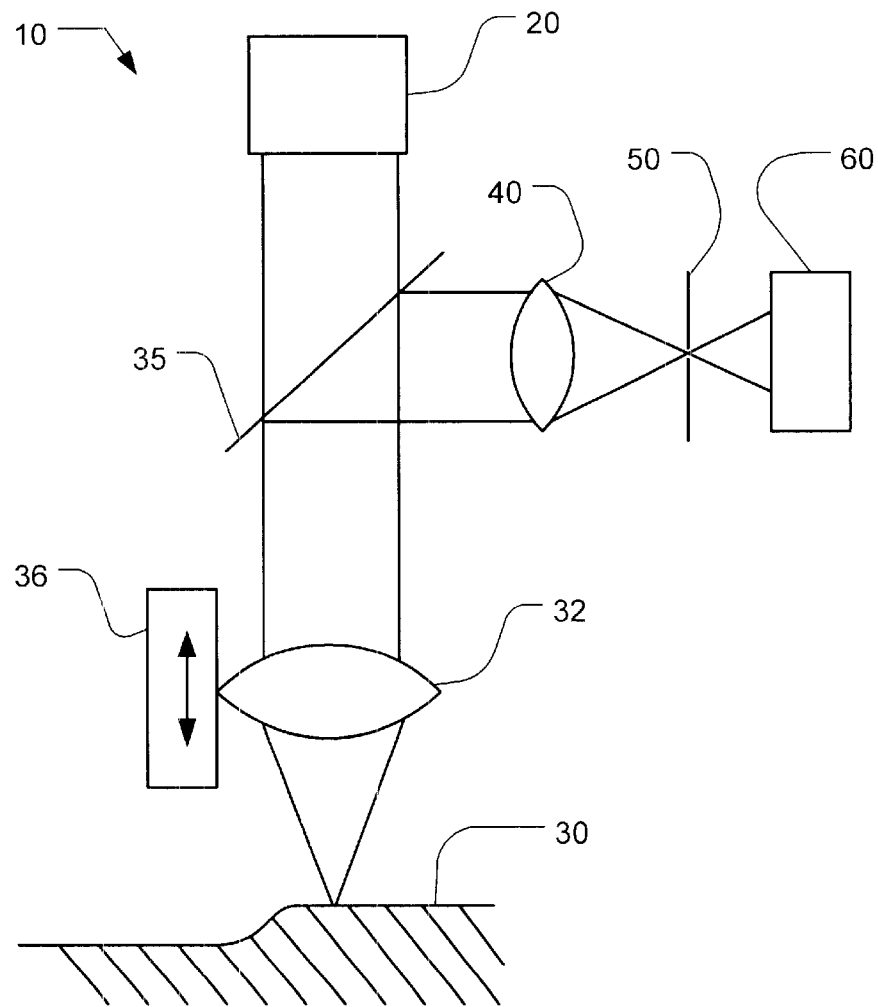
FIG. 1 is a block diagram of a conventional laser confocal displacement sensor that uses a single spot to measure the surface of a sample.
Figure 3:
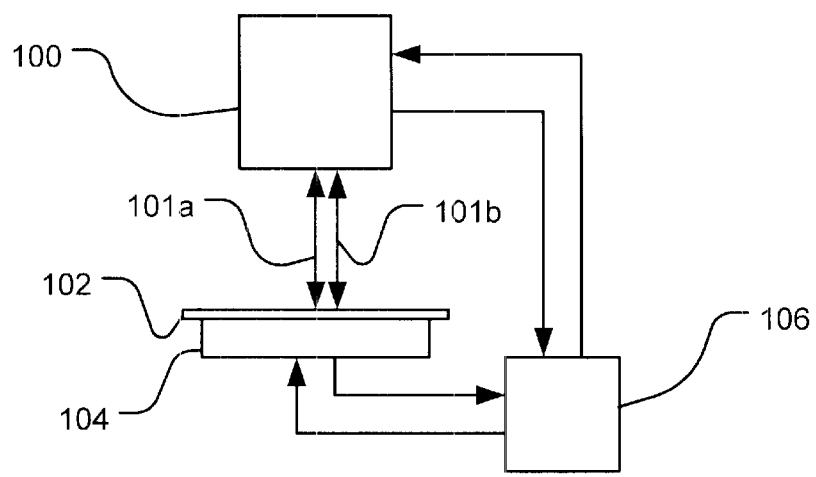
FIG. 3 is a block diagram showing the confocal displacement sensor of the present invention and the associated hardware used to monitor the surface features of a substrate.

FIG. 3 is a block diagram showing the confocal displacement sensor 100 and the hardware used to monitor the surface features of a substrate, e.g., a semiconductor wafer, flat panel display, recording head or other similar type of substrate. The dual spot confocal displacement sensor 100 is oriented above the sample 102 so that the measurement beams 101a and 101b, which produce the two spots on the sample, are orthogonal to the surface of the sample 102. In one embodiment, the displacement sensor 100 includes a vision system. The sample 102 is placed on a stage 104 so that any position of the sample can be placed under the sensor. The sensor 100 is capable of arbitrarily orienting the two spots on the surface of the sample 102 at any position on the sample 102. A computer 106 controls the stage 104, the orientation of the two spots, sensor 100 and vision system. The computer 106 also collects and analyzes the data from the stage 104 and sensor 100. The computer system includes a computer-usable medium having computer-readable program code embodied therein for performing the collections and analysis of the data in accordance with the present invention. Generating code to perform the collection and analysis is well within the abilities of those skilled in the art in light or the present disclosure.

Pattern recognition software in the computer 106 is used to identify specific measurement positions on the sample 102 and verify the proper location and spacing of the light spots produced by sensor 100. In one embodiment, the camera in the visual system is focused using the sensor 100 in conjunction with the vertical motion capability of the stage 104 and the computer 106. In this embodiment, the middle of the focal plane range of the sensor 100 is confocal with the focal plane of the camera of the visual system so that after focusing the camera, the sensor 100 would be approximately centered within the range of the objective lens driver of the sensor 100.

Figure 4:
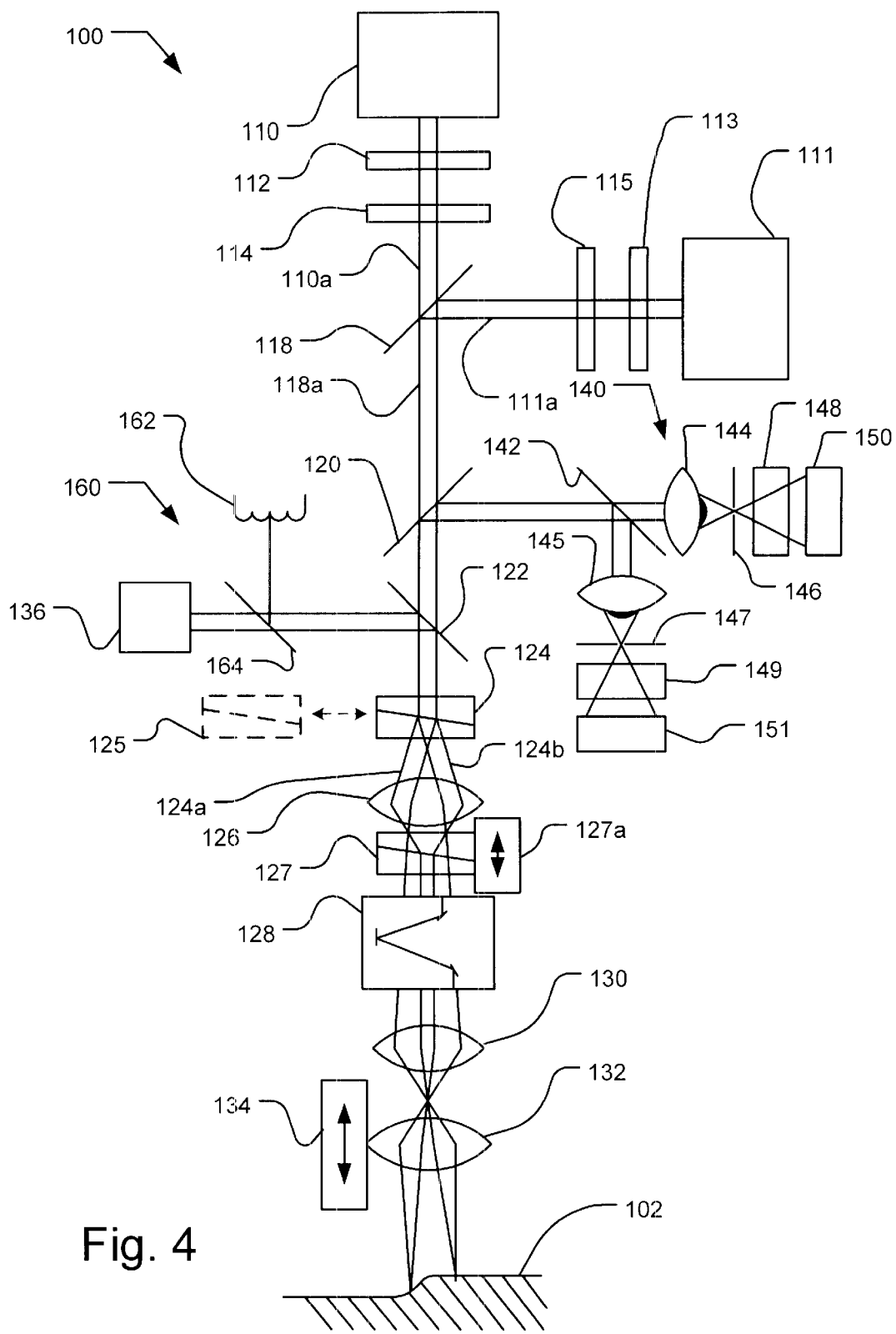
FIG. 4 is a block diagram of a dual spot laser confocal sensor using two light sources, in accordance with an embodiment of the present invention.

FIG. 4 is a block diagram of a dual spot laser confocal sensor 100 using two light sources 110 and 111 with different wavelengths, in accordance with an embodiment of the present invention. The two separate light sources 110 and 111 may be, e.g., lasers that emit different wavelengths of light. The wavelengths produced by lasers 110 and 111 should be separated sufficiently so that the light produced can be filtered from each other. For example, 633 nm and 670 nm solid-state lasers may be used. A shorter wavelength 532 nm laser may also be used if greater separation in wavelength is desired, but the 633 nm and 670 nm lasers are generally more economical and reliable.

If desired, a light emitting diode (LED) or LED array can be substituted for either laser 110 or 111, if the LED is adequately bright, properly collimated and narrow in bandwidth. An LED source may have economical advantages and intensity control advantages over a laser source. Another potential advantage of an LED source is the more uniform intensity across the diameter of the beam compared to the gaussian distribution of a laser-generated beam. An LED source may enhance the effective NA of the lenses used in sensor 100 compared to the effective NA associated with a laser source thereby potentially improving the measurement precision.

A rotating half waveplate 112 (for the specific wavelength of laser 110) followed by a fixed polarizer 114 allows the intensity of the laser 110 to be manually adjusted. If the light source is not polarized, a rotating polarizer, followed by a fixed polarizer, allows the intensity of the laser 110 to be manually adjusted.

Similarly, a rotating half waveplate 113 (for the specific wavelength of laser 111) followed by a fixed polarizer 115 allows the intensity of the laser 111 to be manually adjusted. If the light source is not polarized, a rotating polarizer followed by a fixed polarizer allows the intensity of the laser 111 to be manually adjusted.

If either laser 110 or 111 or LED sources have an electronic intensity control, the need for the rotating half waveplate or rotating polarizer is eliminated.

The polarizers 114 and 115 are oriented 90 degrees to each other so that the beams may be separated by polarization.

The two laser beams 110a and 111a from lasers 110 and 111, respectively, are combined into a single, coincident beam 118a by a broadband polarizing beamsplitter 118. The polarization orientation lasers 110, 111 and beamsplitter 118 are chosen so that the polarized beam 110a is transmitted while the polarized beam 111a is reflected. With the proper orientation of the two polarizers 114 and 115, polarizing beamsplitter 118 can combine and output a larger fraction of the incident laser light compared to using a non-polarizing beamsplitter. For example, polarizing beamsplitter 118 will transmit up to 90 percent of a 633 nm beam from laser 110 and will reflect over 99 percent of a 670 nm beam from laser 111. Linear polarizers 114 and 115 will attenuate the beams before reaching beamsplitter 118 according to the type of polarizer used, for example, Glan Laser, Glan Taylor, Glan Thompson or sheet polarizers. A dichroic beamsplitter can be used in place of a polarizing beamsplitter 118 if the wavelengths of the two lasers 110 and 111 are sufficiently separated, e.g., 532 nm and 633 nm, as opposed to 633 nm and 670 nm. A dichroic beamsplitter, for example, will transmit up to 90 percent of one wavelength and reflect up to 99 percent of the other wavelength when chosen properly independent of the polarization states of these two beams.

A fraction of beam 118a is transmitted through two non-polarizing beamsplitters 120 and 122. The fractions of the beam reflected from beamsplitters 120 and 122 are not used.

The single beam 118a is then split into two diverging beams 124a and 124b, which are approximately symmetrical, by a Wollaston prism 124. Polarizers 114 and 115 are both oriented 45 degrees to the optical axis of the Wollaston prism 124 and are oriented 90 degrees from each other. The divergence angle between the two beams 124a and 124b emanating from the Wollaston prism 124 is determined by the wavelengths of the two lasers, the internal angle and the material properties of the Wollaston prism. The use of Wollaston prism 124 and the orientation of the optical components result in each beam 124a and 124b being composed of the radiation from a single laser, i.e., each beam is monochromatic.

If desired, a Rochon prism could be used to create two beams in place of Wollaston prism 124. The Rochon prism creates one un-deviated beam traveling down the center of the optical path and one deviated beam. The Wollaston prism 124 is advantageous, however, due to the superior symmetry of the divergence angle with respect to the incoming beam vector and the ability to choose from any number of divergence angles.

The two beams 124a and 124b are then refracted by lens 126. A second Wollaston prism 127 (or Rochon prism) follows lens 126 and has its optical axis aligned to Wollaston prism 124. Wollaston prism 127 can be linearly translated using driver 127a with respect to the first Wollaston prism 124 to vary the spacing of the two spots produced on the sample surface. It should be understood that Wollaston prism 127 and driver 127a can be eliminated if the spacing of the two spots produced on the sample surface are not to be varied.

The two beams then reflect off of the three surfaces of the K-mirror 128. The K-mirror is capable of orienting the two beams 124a and 124b on the sample surface at any desired angle. When the K-mirror 128 rotates through 90 degrees the two spots rotate through 180 degrees. If it is desirable to always have the same spot in front in a differential scan or to designate one spot as the measurement spot in a referential scan, the K-mirror 128 can rotate through 180 degrees while the two spots rotate through 360 degrees on the sample. Alternatively, a dove prism, which uses refraction instead of reflection, can be used in place of K-mirror 128.

Figure 14A:
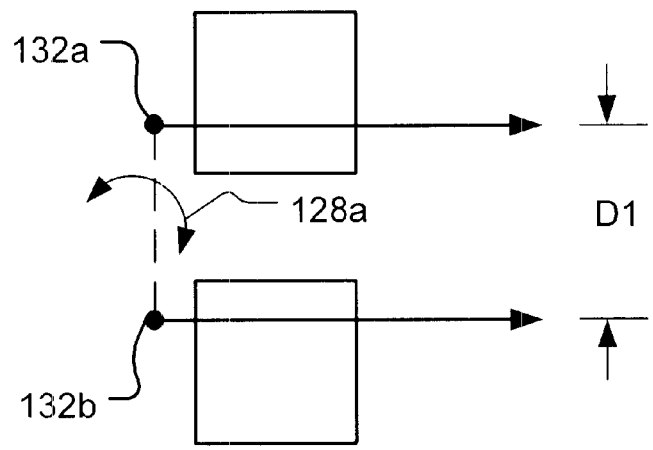
FIGS. 14A and 14B illustrate varying the effective spacing between the measurement spot and the reference spot.
Figure 14B:
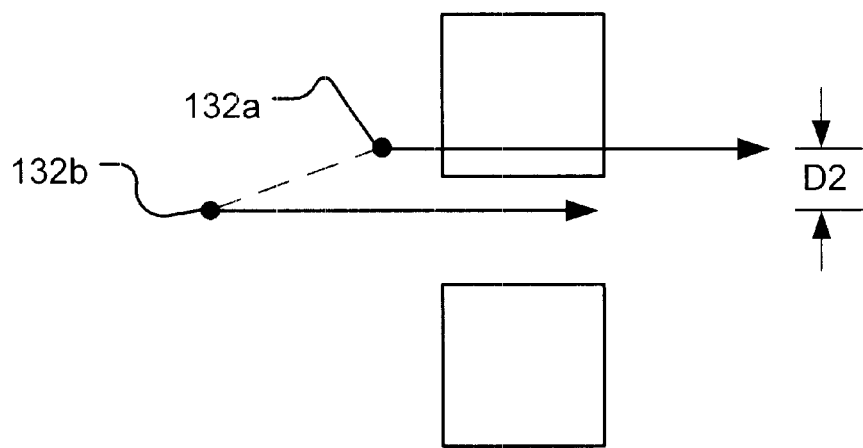

In another embodiment, only one Wollaston prism 124 is used with K-mirror 128, i.e., Wollaston prism 127 is not used. Without the second Wollaston prism 127, the spacing between the spots is fixed. Nevertheless, the effective spacing in the direction of scanning of the two spots on the sample can be varied by appropriate rotation of the K-mirror 128. The effective spacing of the two spots, orthogonal to the direction of travel, may be varied from the maximum spacing to essentially zero spacing. FIG. 14A shows how two spots 132a and 132b with a large fixed spacing, indicated by the dotted line have a large spacing D1 orthogonal to the direction of travel. Consequently, as shown in FIG. 14A, the spots 132a and 132b may travel over different features. By rotating the K-mirror 128, indicated by arrow 128a in FIG. 14A, the orientation of the two spots 132a and 132b can be altered. Thus, the rotation of K-mirror 128 can be used to alter the effective spacing between the two spots 132a and 132b to any desired spacing between the maximum spacing (as illustrated in FIG. 14A) to essentially zero spacing. As shown in FIG. 14B, the effective spacing between spots 132a and 132b is decreased to D2 in the direction orthogonal to the direction of the scan. Consequently, spot 132b can serve as a reference spot, while spot 132a serves as the measurement spot. Moreover, if desired, as shown in FIG. 14B, the orientation of the spots may be changed so that spot 132b leads spot 132a in the direction of travel.

The two beams 124a and 124b then pass through a lens (or series of lenses) 130 and a focusing objective lens 132 and intercept the surface of the sample 102 at normal incidence in the desired orientation. The objective lens 132 is driven orthogonally with respect to the surface of the sample 102 over a specified range by a piezoelectric or voice coil driver 134, as indicated by the arrow. The range of motion of the objective lens 132 should include all of the positions where the focal plane of the objective lens coincides with the sample surface 102 for both beams 124a and 124b plus an additional amount. The range of the driver 134 will be determined by the size of the step height to be measured, the focusing capability of the metrology system and the required step height resolution.

The two beams are then reflected back from the surface of the sample 102, travel back through the objective lens 132, lens 130, and through the K-mirror 128, which rotates the two beams back to their original orientation. The reflected beams continue to travel back through Wollaston prism 127, lens 126 and are recombined into a single beam after traveling back through Wollaston prism 124. The recombined beam is partially transmitted through beamsplitter 122. As will be discussed below, a fraction of the recombined beam reflected from beamsplitter 113 may be imaged by a camera 136.

The recombined beam is then reflected by beamsplitter 120 into the detector leg 140 of the system 100. It should be understood, that if desired, the beamsplitter 120 may be located in other locations, e.g., between prism 127 and lens 126 or between lens 126 and prism 124.

The reflected beam from beamsplitter 120 is split again by beamsplitter 142 so that the beam can be measured by two independent detectors. Beamsplitter 142 can be a broadband, non-polarizing type with half the intensity of each wavelength being transmitted and half the intensity of each wavelength being reflected. The use of a non-polarizing beamsplitter will result in approximately half of the signal at each wavelength being lost before reaching the filters. If the two laser wavelengths are sufficiently separated, e.g., from the use of a 532 nm laser and a 633 nm laser, beamsplitter 142 can be a dichroic beamsplitter. A dichroic beamsplitter will transmit up to 90 percent of one wavelength and reflect up to 99 percent of the other wavelength if chosen properly. Thus, the use of a dichroic beamsplitter results in much larger signals being measured by each detector compared to utilizing a broadband non-polarizing beamsplitter.

The beam that is transmitted through beam splitter 142 passes through a detector lens 144 with a fraction of the beam being blocked by the opaque center of the detector lens 144. The unblocked portion of the beam is refracted and focused by the outer perimeter of detector lens 144 onto pinhole 146. For example, a 10μ, pinhole may be used. If desired, the detector lens 144 need not have an opaque center, i.e., the beam is not blocked.

The portion making it through the pinhole 146 is then filtered by a bandpass interference filter 148, which passes only the desired wavelength, e.g., the 633 nm component, of the beam to detector 150. Thus, a focal plane dependent fraction of the 633 nm beam intercepts detector 150 after transmission through pinhole 146 and filter 148.

The beam that is reflected by beamsplitter 142 is treated in a similar manner as the transmitted beam. The reflected beam passes through a detector lens 145 and a fraction of the beam is blocked by the opaque center of the detector lens 145. (once again optional) The unblocked portion of the beam is refracted and focused by the outer perimeter of detector lens 145 onto pinhole 147. The portion making it through the pinhole 147 is then filtered by a bandpass interference filter 149, which passes only the desired wavelength, e.g., the 670 nm component, of the beam to detector 151. A focal plane dependent fraction of the 670 nm beam intercepts detector 141 after transmission through pinhole 137 and filter 139.

The detectors 150 and 151 can be either single element detectors or multi-element detectors. The signals from all of the elements of a multi-element detector can be combined to yield the total signal from the detector. Both single and multi-element detectors will yield similar total signal versus objective lens position plots. A multi-element detector will also provide additional information about the shape, size and position of the signal making it through the pinhole and filter as a function of the objective lens position. An analysis of the shape, size and position of the signal as well as the total intensity as a function of objective lens position may improve the vertical resolution of the measurement.

It should be understood that the filters 148 and 149 may be chosen from a number of filters. For example, in a typical example with 633 nm and 670 nm lasers, three cavity bandpass interference filters at the laser wavelengths with full width half maximum (FWHM) values of 11 nm may be used to filter out over 99 percent of the other laser wavelength. Filters with larger FWHM values can be used to achieve comparable separation with larger differences in wavelengths between the two lasers. More extreme ratios of the two wavelengths at detectors 150 and 151 can be achieved with the same FWHM filters with larger differences in wavelengths between the two lasers. To avoid excessive attenuation, it is desirable to match the laser wavelength to the center wavelength (CWL) of the filter.

If desired, edge pass interference filters can be substituted for bandpass interference filters in the detector leg 140. A long-pass edge filter slightly below the longer source wavelength and a short-pass edge filter slightly above the shorter source wavelength can be substituted to essentially isolate each spot on each detector. Edge pass filters may be particularly appropriate when sensor 100 uses wavelengths that have a large separation, e.g., 532 nm and 633 nm, because when the wavelengths are close, e.g., 633 nm and 670 nm lasers, the edge pass filters may be difficult to implement. A disadvantage with edge pass filters is that they will reject less stray light in their respective passbands compared to bandpass filters. An advantage of edge pass filters is that they will exhibit less sensitivity to matching the filter to the source wavelength compared to a bandpass filters.

Figure 5:
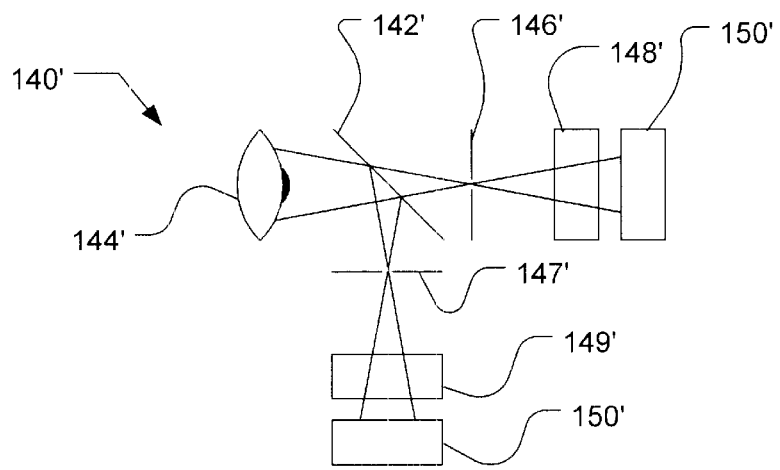
FIG. 5 is a block diagram of an embodiment of the detector leg in which a single detector lens is used.

There is a small distance between the detector lens 144 and the pinhole 146 in the detector leg 140, which advantageously permits high NA lenses to be employed. This distance may be of the order of 10 mm for a lens with an NA of 0.5. If desired, however, a single detector lens before the beamsplitter may be used in the detector leg. FIG. 5 is a block diagram of an embodiment of the detector leg 140' in which a single detector lens 144' is located before the beamsplitter 142'. In the configuration of FIG. 5, the distance between the lens 144' and either pinhole 146' or 147' is typically larger than the embodiment shown in FIG. 4, and thus, a lens 144' must have a smaller NA for a given beam diameter. Alternatively, one pinhole at the focal point of lens 144' may be located between lens 144' and beamsplitter 142' allowing the use of a large NA lens.

In order to simplify and enhance the use of the dual wavelength, two spot confocal displacement sensor 100, a vision system 160 is included as shown in FIG. 4. The vision system 160 is also necessary if pattern recognition software will be used to precisely identify and navigate to specific measurement locations on the sample. Vision system 160 includes a white light source 162 that produces light that partially reflects off of beamsplitter 164 and beamsplitter 122 to illuminate the surface of the sample 102. After the white light reflects off of the surface of the sample 102 and beamsplitter 122, the light is transmitted through beamsplitter 164 and intercepts the camera 136. The choice of optics in the camera 136 and the objective lens 132 will determine the field of view imaged by the camera 136. The camera 136 will also image the two laser spots intercepting the surface of the sample facilitating focusing, orientation, calibration and alignment.

The camera image may be focused by analyzing the signal from the vision system 160 or alternatively may be focused by analyzing the data from the sensor 100. In either case, the computer 106 (shown in FIG. 3) controls the vertical motion of the stage 104 to achieve a focused image at the camera. Since the focal plane of the sensor 100 is made confocal with the focal plane of the camera 136, the sensor 100 can be used to focus the camera 136 and place the focal plane of the objective lens approximately centered within the range of the objective lens driver 134.

It should be understood that additional elements may be included in confocal displacement sensor 100 if desired. For example, a beam expander can be implemented after beamsplitter 118 and before objective lens 132 to increase the size of the two coincident beams to improve the collimation of the beam and adequately fill the input aperture of the objective lens to minimize the focused spot size. Alternatively, one or two beam expanders can be inserted after each source preceding beamsplitter 118. This might be done if each beam was a different size and it was desired that they be the same size after exiting beamsplitter 118. Another reason to have two beam expanders is if two different spot sizes were desired. One beam could be expanded to fill the input aperture of the objective lens resulting in a minimum spot size, while the second beam could be made much smaller than the objective lens input aperture with the second beam expander to produce a larger spot size. A beam expander right before objective lens 132 would allow the use of smaller optical components since the beam would be smaller for most of the optical path. Beam expanders preceding beamsplitter 118 would require larger optics for all of the components in the optical path following this beamsplitter.

In one embodiment, two switchable Wollaston prisms 124 and 125 are used. The two prisms can be linearly translated or rotated so either one is in the optical path. In this embodiment, Wollaston prism 127 and driver 127a are eliminated. One Wollaston has a small spacing (for a differential scan) while the second Wollaston has a larger spacing (for a referential scan). The k mirror 128 can be used to rotate the two spots and change the distance between the two spots orthogonal to the scan direction during a referential scan to achieve any spacing less than the maximum spacing between the two points. The reference spot can be chosen to be ahead of or behind the measurement spot as shown in FIGS. 14A and 14B.

Figure 6:
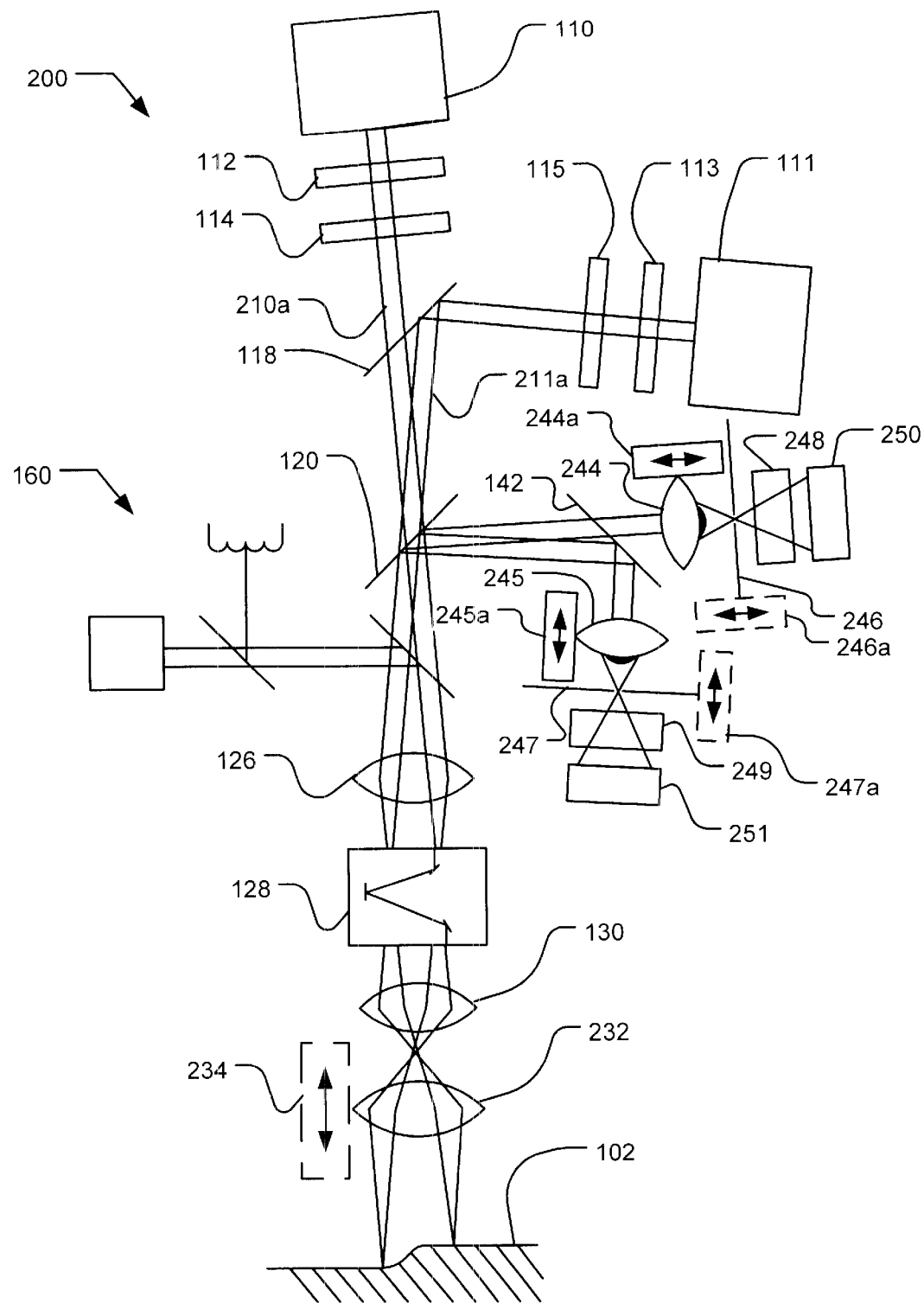
FIG. 6 is a block diagram of a dual spot laser confocal sensor using two light sources, in accordance with another embodiment of the present invention.

FIG. 6 is a block diagram of a dual spot laser confocal sensor 200, in accordance with another embodiment of the present invention. Displacement sensor 200 is similar to displacement sensor 100, like designated elements being the same. Light sources 110 and 111 may use the same or different wavelengths of light. Displacement sensor 200, however, creates two spots on the sample 102 by misaligning one light source 110 with respect to the other light source 111 (they are not parallel) to achieve the desired spot spacing on the sample surface. If desired, one beam can be made to travel down the center of the optical path, neither beam can be made to travel down the center of the optical path or both beams can be symmetrical to the center of the optical path. It should be understood that a number of configurations and devices may be used to produce non-parallel beams. For example, as shown in FIG. 6, a beam splitter 118 is used to transmit beam 210a and reflect beam 211a. However, other configurations may be used as will be readily apparent to one skilled in the art in light of the present disclosure. For example, one of the beams maybe reflected by a mirror instead of beamsplitter while the other beam does not pass through a beamsplitter. Alternatively, fiber optics may be used to direct the beams in the desired manner.

Polarization is not required to create the two monochromatic spots on the sample surface in FIG. 6, so Wollaston prisms 124 and 127 and driver 127a from FIG. 4 are eliminated. Polarizers following the lasers are only needed to control intensity.

As shown in FIG. 6, the two detector lenses 244, 245 are oscillated by way of a piezoelectric or voice coil drivers 244a, 245a, instead of oscillating the objective lens 232. In another embodiment, the pinholes 246, 247 can be oscillated by drivers 246a, 247a, illustrated by broken lines, while objective lens 232 and detector lenses 244, 245 are held stationary. Of course, objective lens 232 can be oscillated by objective lens driver 234 instead of oscillating the detector lenses or pinholes similar to the configuration in FIG. 4.

The oscillations of the detector lenses 244, 245 (or pinholes 246, 247) may be performed in phase, or if desired out of phase if the precise position of the lenses or pinholes are recorded, or the resulting measurements will be inaccurate. It should be understood, that the oscillating detector lenses 244, 245 (or pinholes 246, 247) may be used with the displacement sensor 100 shown in FIG. 4. Moreover, it should be understood that filters 248 and 249 may be removed in FIG. 6 if desired, but may be used to block stray light.

Figure 7:
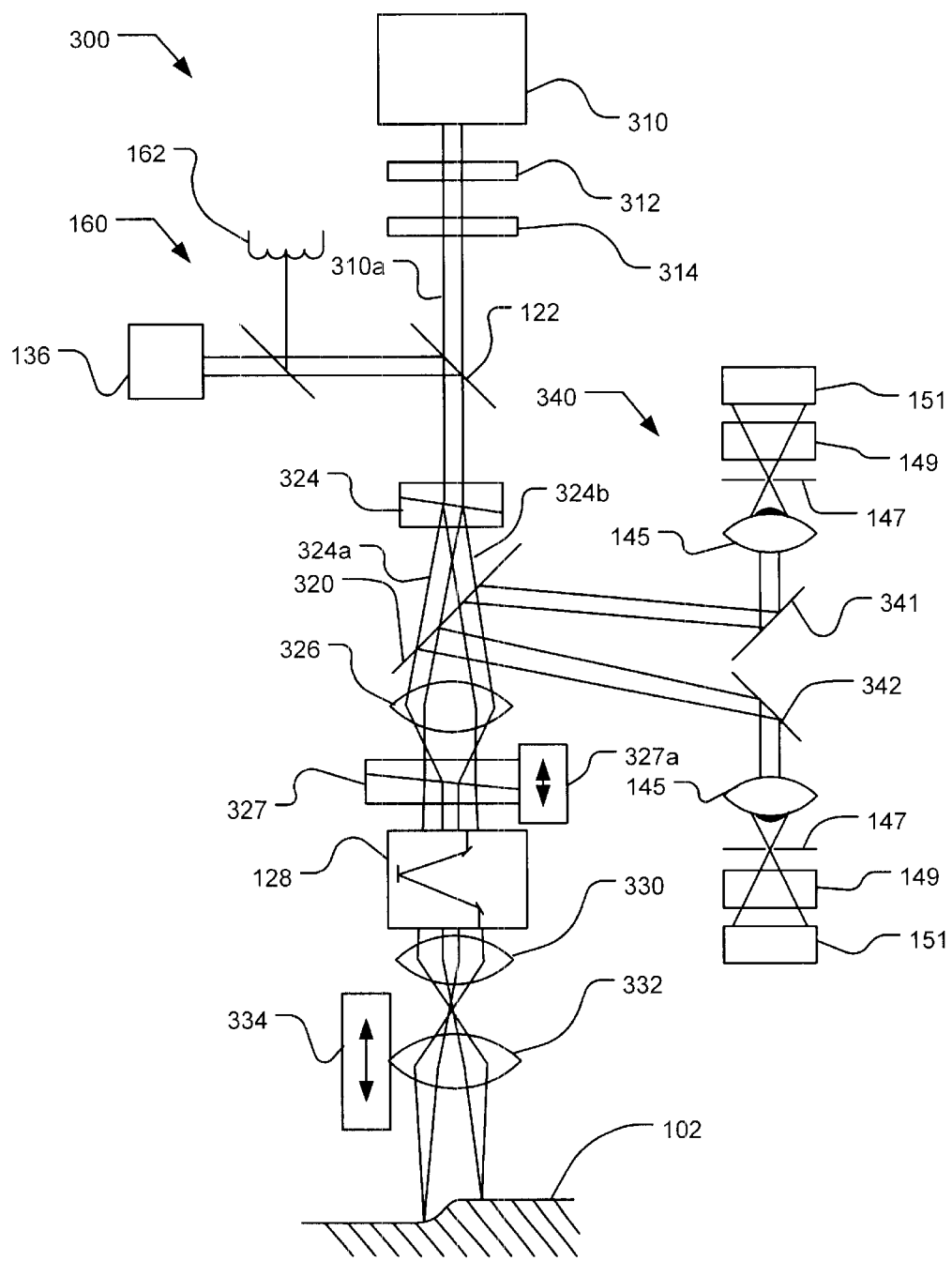
FIG. 7 is a block diagram of a dual spot confocal displacement sensor using a single light source, in accordance with an embodiment of the present invention.

FIG. 7 is a block diagram of a dual spot laser confocal displacement sensor 300 using a single light source, in accordance with an embodiment of the present invention. Displacement sensor 300 is similar to displacement sensor 100, however only a single wavelength of light from light source 310 is used. Light source 310 may be, e.g., a red laser or LED. Light source 310 is followed by rotating half waveplate 312 and a fixed polarizer 314 allowing the intensity of the light to be adjusted. Electronic adjustment of intensity could also be employed eliminating rotating half waveplate 312.

The single beam 310a in displacement sensor 300 is split into two symmetrical, diverging beams 324a, 324b by Wollaston prism 324. Polarizer 314 is oriented 45 degrees to the optical axis of Wollaston prism 324 so that each exiting beam is of approximately the same intensity. The divergence angle between the two beams emanating from Wollaston prism 324 is determined by laser wavelength, the internal angle and material properties of the Wollaston prism.

Figure 13:
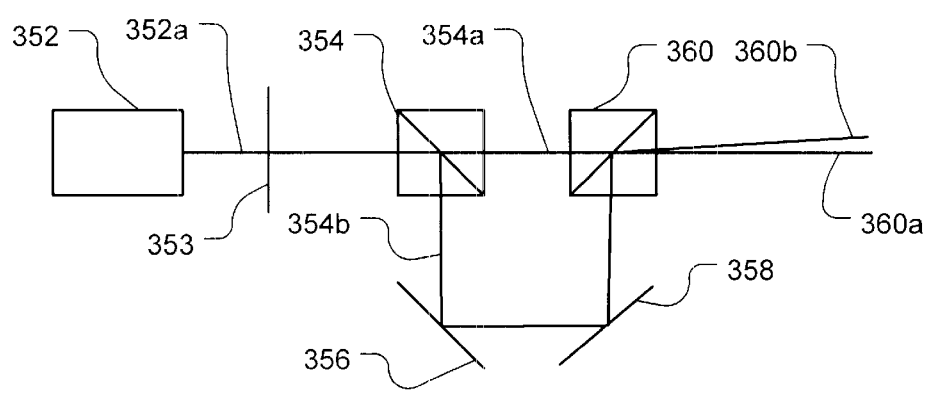
FIG. 13 illustrates splitting a single beam into two divergent beams using polarization.

FIG. 13 shows another embodiment of splitting a single beam into two divergent beams using polarization. As shown in FIG. 13, light source 352, which is, e.g., a laser or LED, produces a single beam 352a that is incident on a first beamsplitter 354 through polarizer 353. Polarizer 353 is oriented 45 degrees to the optical axis of beamsplitters 354 and 360. Beamsplitters 354 and 360 have their optical axis aligned to each other. This configuration will create two beams of equal intensity. A portion of beam 352a is transmitted through beamsplitter 354 forming beam 354a and a portion of beam 352a is reflected toward mirror 356 forming beam 354b. Beam 345b is reflected off mirrors 356 and 358 toward beamsplitter 360. Beamsplitter 360 reflects beam 354b to form beam 360b and transmits at least a portion of beam 354a to form beam 360a. At least one of mirrors 356 and 358 is adjusted so that the resulting beam 360b is deviated from beam 360a. The beam splitter shown in FIG. 13 may also be used with sensor 200 shown in FIG. 6, where only one light source is used.

Referring back to FIG. 7, the two beams 324a, 324b are then transmitted through a non-polarizing beamsplitter 320 and are refracted by lens 326. Optionally, a second Wollaston prism 327 has its optical axis aligned to Wollaston prism 324 and can be linearly translated by driver 327a with respect to the first Wollaston prism 324 to vary the spacing of the two spots on the sample surface. The two beams 324a, 324b pass through K-mirror 128 and are then refracted by lens 330, pass through objective lens 332 and intercept the surface of the sample 102 in the desired orientation. If desired, switchable Wollaston prisms, as discussed below in reference to FIG. 8A, may be used.

As discussed in reference to FIG. 4, a driver 334 drives the objective lens 332 orthogonally with respect to the surface of the sample over a specified range that includes all of the positions where the focal plane of the objective lens coincides with the sample surface for both beams plus an additional fraction. As discussed above, if desired, the detector lenses or pinholes may be driven instead of the objective lens.

The light beams are reflected off of sample 102 in FIG. 7, pass back through the optical elements and are reflected off of beamsplitter 320 to the detector leg 340. Detector leg 340 is similar to the detector leg 140 in FIG. 4, however, two separate mirrors 341 and 342 are used to separate the beams instead of a beamsplitter.

Figure 8A:
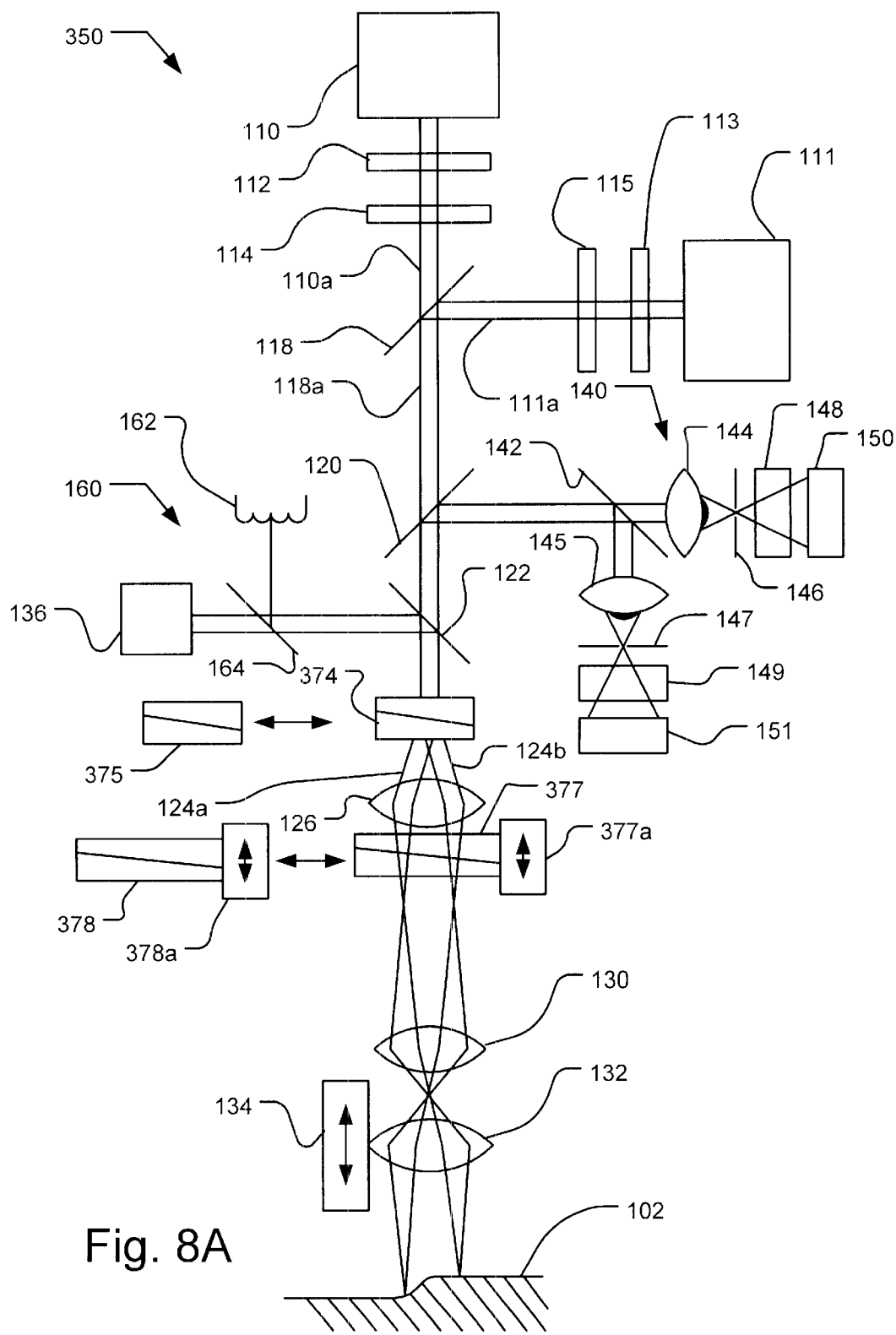
FIG. 8A is a block diagram of a dual spot confocal displacement sensor in accordance with another embodiment of the present invention.

FIG. 8A shows another embodiment of a dual spot confocal displacement sensor 400 in accordance with another embodiment of the present invention. Sensor 350 is similar to sensor 100 shown in FIG. 4, like designated elements being the same. However, as shown in FIG. 8A, a K-mirror is not used, but instead two switchable sets of Wollaston prisms are employed. One set of prisms 374 and 377 is used to produce one alignment of the two spots on the surface of the sample. A second set of prisms 375 and 378 is switched with the first set of prisms to produce a different alignment of the two spots on the surface of the sample. If desired, prisms 377 and 378 and drivers 377a and 378a may be eliminated, but the flexibility of the system is reduced.

The two sets of switchable prisms are oriented, e.g., 90 degrees with respect to each other. The polarizer 314 is oriented 45 degrees to either set of prisms. Thus, the use of two sets of prisms permits the spots on the sample to be orientated in two perpendicular orientations. Once again, Rochon prisms could be substituted for the Wollaston prisms.

The complexity associated with the making and aligning of a K-mirror or dove prism might favor this configuration. However, this embodiment may be difficult to use with an R-θ stage. A proper differential scan can only be performed when the scan vector is parallel to the spot orientation. If the spot spacing is small, a scan vector that is not parallel to the spot orientation may be acceptable. One spot will follow the other with a slight offset in paths. The angle between the spot orientation and scan vector should be less than 45°, one of the Wollaston prisms will always produce an angle less than or equal to this value. Of course, if the scan vector is orthogonal to the spot orientation, a differential scan will not work as there will essentially be no phase difference between the two spots. The angle between the spot orientation and the scan vector is also used along with the nominal spot spacing to calculate the spacing of the spots along the scan vector direction for the integration of the slope of the height profile to yield the actual height profile. A referential scan will have the spacing between spots along the scan vector direction vary with the scan vector. The minimum spacing will occur when the scan vector is parallel to the spot orientation while the maximum spacing will occur when the scan vector is orthogonal to the spot orientation. This variation in spacing may be acceptable as long as the reference spot scans a flat region and the measurement spot traverses the feature to be measured.

Figure 8B:
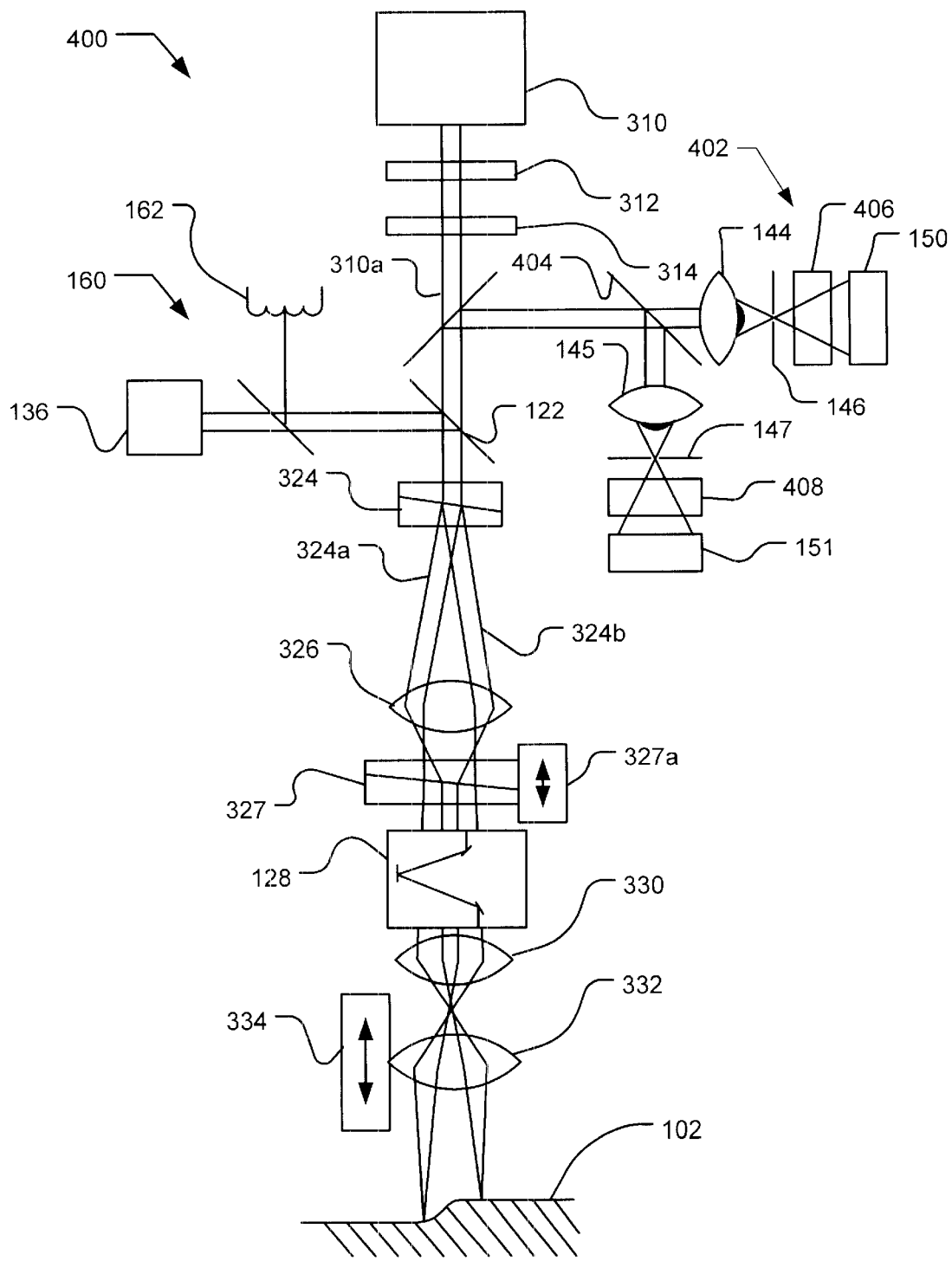
FIG. 8B is a block diagram of a dual spot confocal displacement sensor using a single light source in accordance with another embodiment of the present invention.

FIG. 8B is a block diagram of a dual spot laser confocal displacement sensor 400 using a single light source, in accordance with an embodiment of the present invention. Displacement sensor 400 is similar to displacement sensor 300 in FIG. 7, like designated elements being the same. The detector leg 402 in sensor 400 is similar to the detector leg 140 of sensor 100 shown in FIG. 4. The detector circuit 402 in FIG. 8B uses polarization (not filtration or physical separation) to direct the two beams to individual detectors. Polarizing beamsplitter 404 is oriented 45 degrees to the optical axis of the Wollaston prism 324. If the beams 324a and 324b retain a high percentage of their initial linear polarization after reflection from the sample surface 102, the polarizing beamsplitter 404 in the detector circuit 402 directs each beam to a separate detector150 and 151. One polarization state is transmitted while the other polarization state is reflected by beamsplitter 404. Filters 406 and 408 (for example, bandpass filters both at the wavelength of the source 310) are optional but may prove useful to exclude background ambient light leakage.

Some leakage of one beam into the detector of the other beam will modify the calculated height difference between the two spots from the correct value. For example, when the two laser beams 324a and 324b intersect the surface of the sample 102 at non-normal incidence, the polarization of each beam may be modified. Modification of the polarization state of the beams can be a consequence of poor alignment of the optical head to the sample, curvature of the sample, sloped steps on the sample, the properties of the sample or from a high NA objective lens. A calibration procedure can be implemented to compensate for the hardware induced, cross-contamination of the signals. A calibration sample of known step height can be measured using sensor 400 and a ratio of the actual step height of the calibration sample to the measured step height is derived. Future measurements can then be multiplied by that actual to measured step height ratio to yield a corrected step height value, thereby compensating for signal leakage due to small changes in the polarization of the two signal beams. The calibration procedure can be repeated for different samples if a significant fraction of the error is due to the nature of the sample as well as the hardware (for example, a multi-layer dielectric stack).

Sensor 400 is advantageous as only one light source is required. Additionally, the detector circuit 402 can be simpler and more compact than the detector circuit 340 in FIG. 7.

Figure 8C:
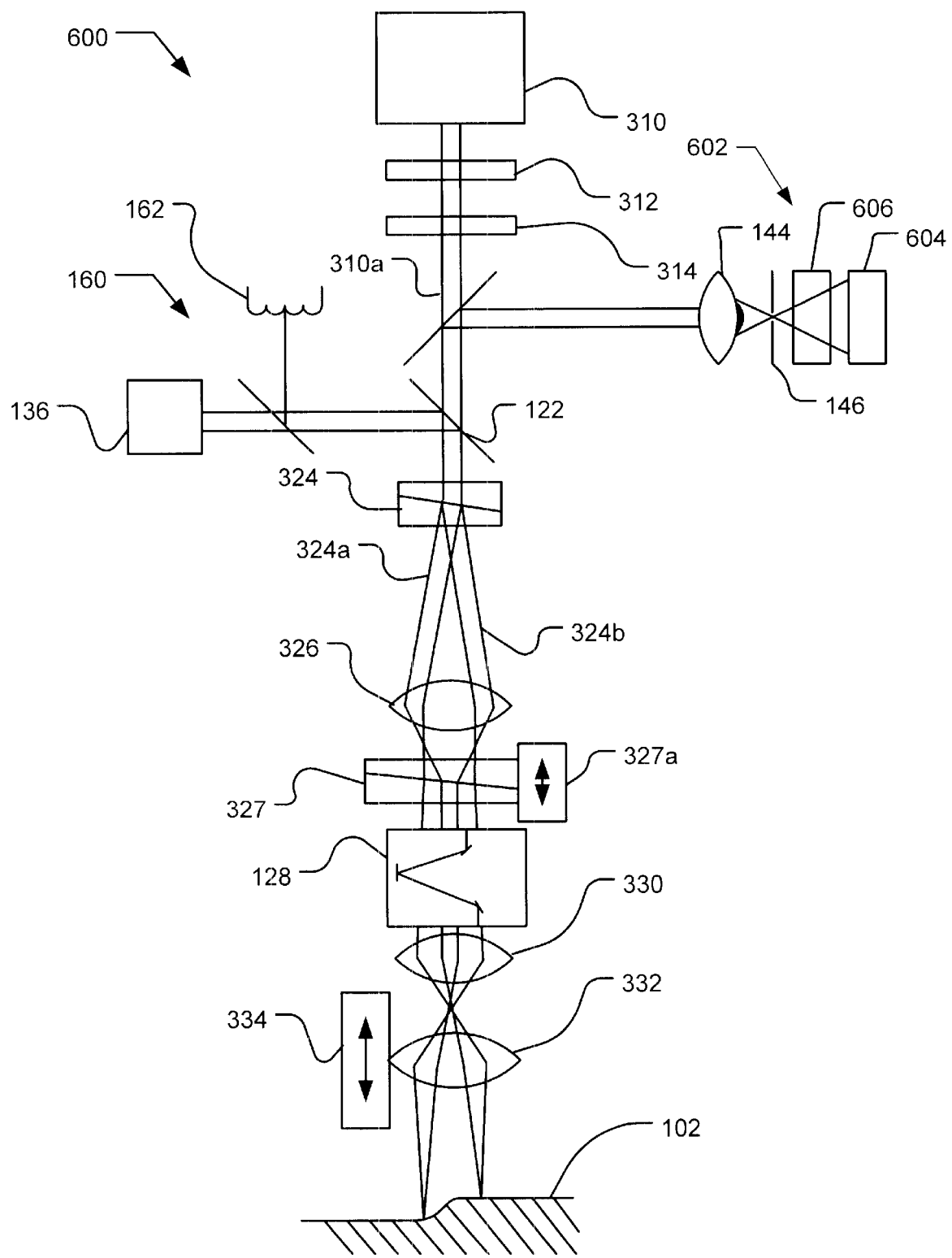
FIG. 8C is a block diagram of a dual spot confocal displacement sensor using a single light source and a single detector in accordance with another embodiment of the present invention.

FIG. 8C is a block diagram of a dual spot laser confocal displacement sensor 600 that uses a single light source and a single detector, in accordance with an embodiment of the present invention. Displacement sensor 600 is similar to displacement sensor 400 in FIG. 8B, like designated elements being the same, however, only one detector is used in sensor 600. The detector leg 602 in sensor 600 is similar to the detector leg 402 of sensor 400 shown in FIG. 8B except that the components 404, 145,147, 408 and 151 shown in FIG. 8B are not used. The sensor 600 combines the signals from both spots and measures the combined signal using detector 604. Advantageously, polarization, filtration and physical separation are not necessary in the detector leg 602 in this configuration. Filter 606 (for example, a bandpass filter at the wavelength of the source 310) is optional but may prove useful to exclude background ambient light leakage.

It should be understood that if desired two light sources, as shown, e.g., in FIGS. 4 and 8, may be used with sensor 600 as long as a filter 606 does not block the wavelengths of either light source. With the use of two separate light sources, as discussed in reference to FIGS. 4 and 8, wavelength may be used to produce the two beams as opposed to polarization state as used with sensor 400 in FIG. 8C.

Figure 2:
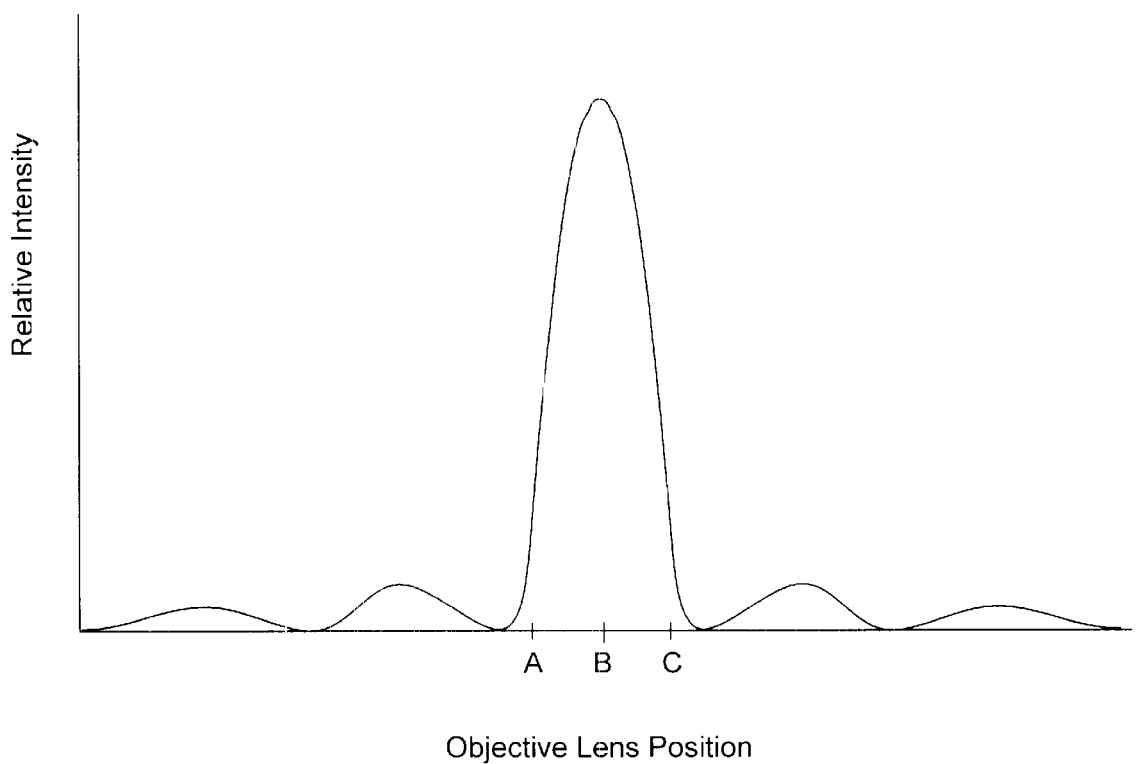
FIG. 2 shows a typical plot of the position of the objective lens along the X axis versus the measured detector signal intensity along the Y axis.
Figure 8D:
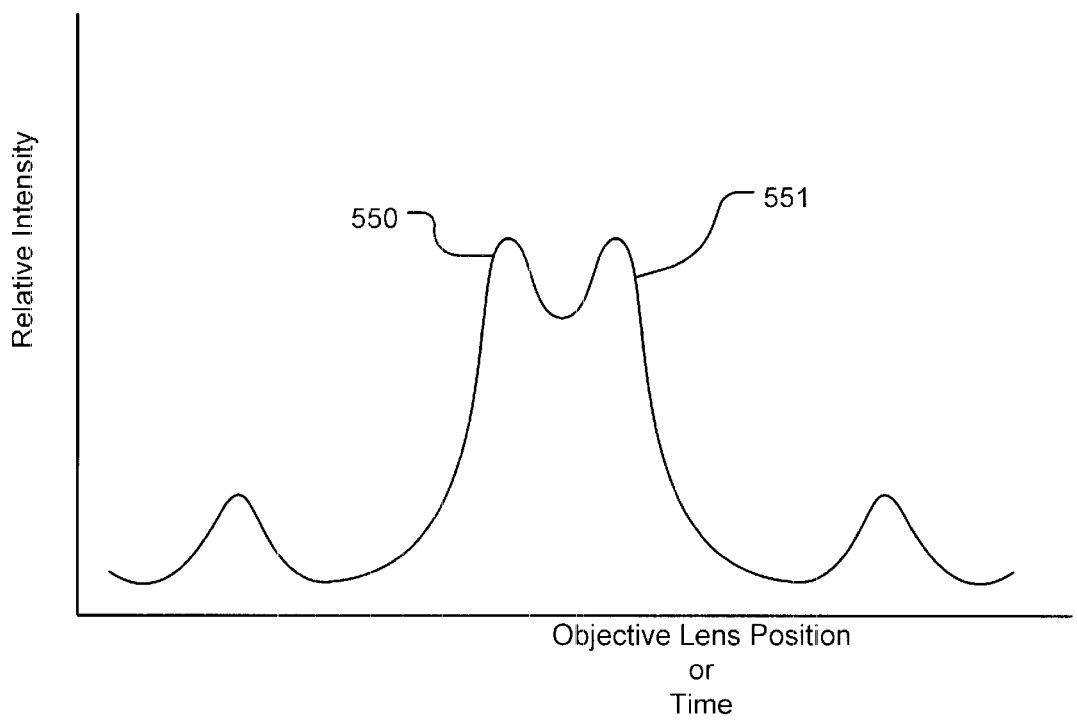
FIG. 8D illustrates the output signals from the single detector in FIG. 8C as a function of the position of the objective lens for each spot or the time.

Instead of a single curve with a single peak as shown in FIG. 2, the detector 604 will generate a curve with two peaks as shown in FIG. 8D. FIG. 8D illustrates the output signals from the single detector 604 as a function of the position of the objective lens for each spot or the time. The position of the peak for each spot can be mathematically extracted or deconvoluted from the curve shown in FIG. 8D, as is well known in the art.

After the two peak extractions, the data analysis is identical to all of the other two detector configurations discussed. The precision capability of the configuration shown in FIG. 8C may be slightly degraded compared to the other two detector configurations due to the required deconvolution. This may be an acceptable precision compromise in light of the hardware advantages of sensor 600, only a single light source and only a single, simpler detector leg 602. Additionally, if each spot intercepts a different material on the surface of the sample, the deconvolution may be further degraded compared to the measurement of a single material sample (there is virtually no degradation of the precision capability of a two detector configuration when two different materials are intercepted). A calibration procedure to determine the relative amplitudes of the signal in each material and the incorporation of this information into the deconvolution algorithm may slightly improve the precision of the deconvolution process.

Figure 9A:
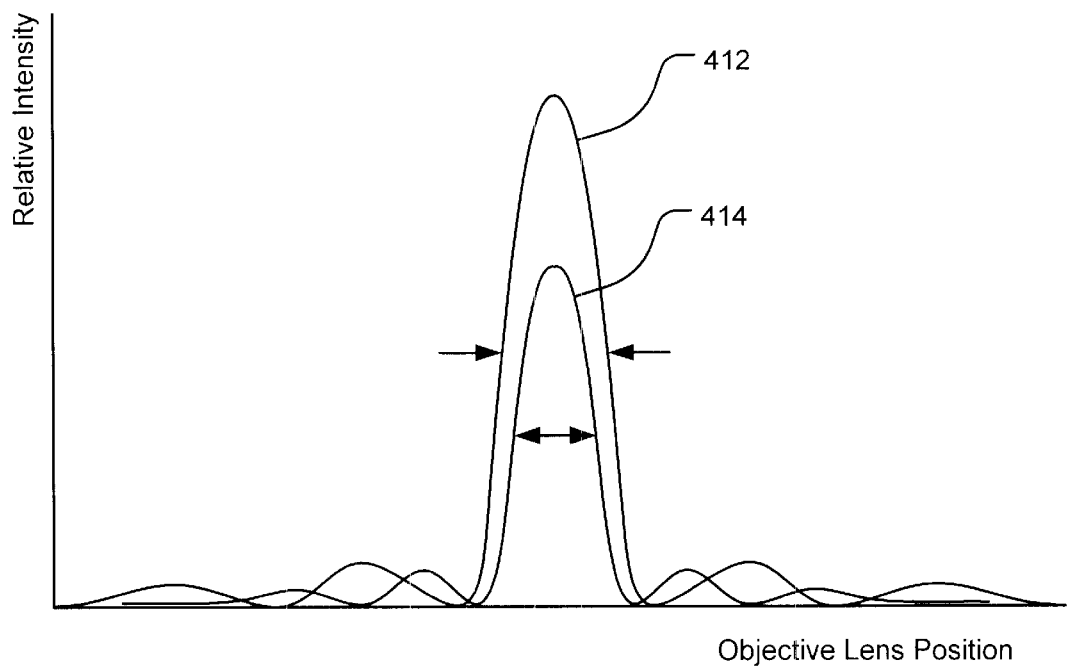
FIG. 9A illustrates the intensity versus objective lens position for a low NA lens and a high NA lens.

To enhance the vertical resolution of the resultant height profile, it is desirable to maximize the change in intensity measured by the detectors as a function of objective lens position. One method of achieving this goal is to use high numerical aperture (NA) lenses for the objective lens and/or the detector lenses. As the focal plane of the objective lens deviates above and below the surface of the sample, less light will intercept the detector through the confocal pinhole when the average angle of incidence to the pinhole increases. This average angle of incidence increases with higher NA lenses. FIG. 9A illustrates the intensity versus objective lens position for a low NA lens 412 and a high NA lens 414. The FWHM for the lower NA lens 412 is seen to be greater than the FWHM for the higher NA lens 414. The vertical resolution improves as the FWHM decreases and is superior for the high NA lens.

Figure 9B:
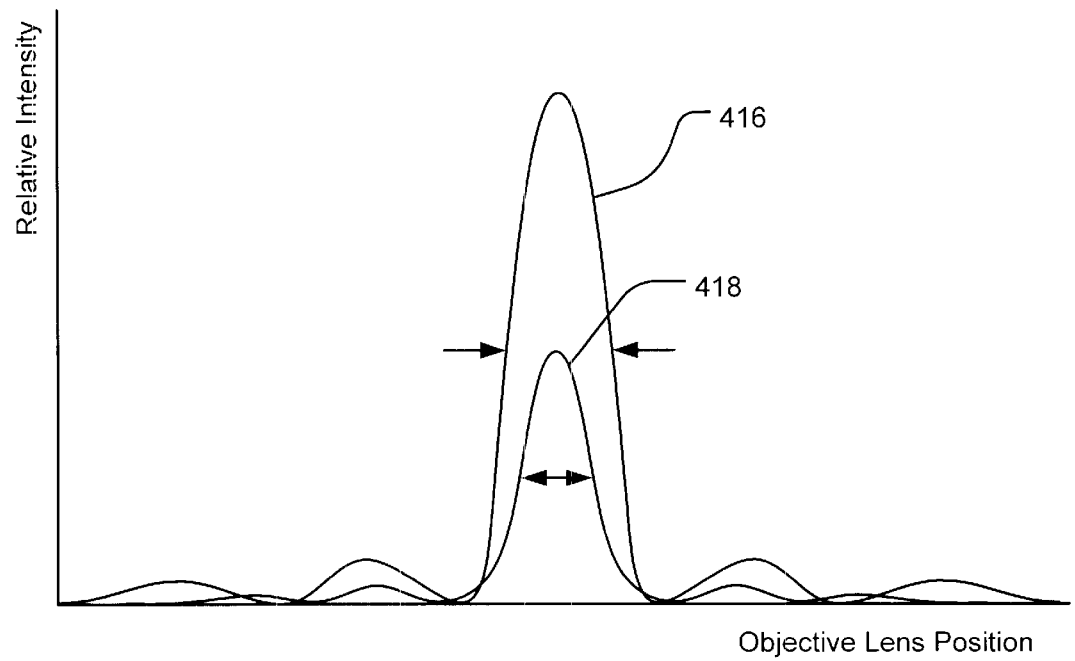
FIG. 9B shows the intensity versus objective lens position for a normal lens and the same lens with obscuration.

Another method to enhance the vertical resolution of the resultant height profile is the use of obscuration, in which the light entering the center of the objective lens and/or detector lens is blocked. The light traveling closer to the center of the optical path of either lens has a greater probability of making it through the pinhole when the focal plane of the objective lens is above or below the surface of the sample. If a fraction of light near the center of either lens is blocked, the intensity will drop off more rapidly as the focal plane of the objective lens is moved away from the surface of the sample. The fraction of the lens to be blocked will be a function of the size of the laser beam and any beam expanding optics and may be different for each wavelength. FIG. 9B shows the intensity versus objective lens position for a normal lens 416 and the same lens with obscuration 418. The FWHM for the normal lens 416 is seen to be greater than the FWHM for the lens with the center blocked 418. The vertical resolution improves as the FWHM decreases and is superior for the blocked lens.

A reflecting objective lens can also be used for this application since it blocks a fraction of light traveling through the center of the lens. The center can be blocked on a refracting lens by depositing an absorbing material on one side of the lens. Another method places a properly aligned blocking element adjacent to the refracting lens. The obstruction can be done to the objective lens, detector lenses or all three lenses.

The choice of lenses, the type of source (laser or LED), the wavelengths of the sources, and the properties of additional optical components will determine the size of the spots projected onto the sample surface. A beam expander may be used to increase the size of the beam to improve the collimation of the beam and adequately fill the input aperture of the objective lens to minimize the focused spot size. The spot size will also vary as the focal plane of the objective lens is scanned from above the surface of the sample to below the surface of the sample. The spot size will be at the minimum value when the focal plane of the objective lens coincides with the surface of the sample. The lateral resolution will be determined by the two spot sizes. Generally, the lateral dimensions of a feature to be measured must exceed the spot size, a spot must fit completely within the feature to ensure an accurate measurement.

The intensity of the signal from a spot measured on a detector may be used to differentiate between different materials present on the surface of the sample. For example, one material may be metal with a high reflectance while the second material may be a dielectric with a low reflectance. The intensity of the signal from a spot may also be used to determine if a detector is being intercepted by light reflected off of one or more materials.

If an attempt to measure a feature smaller than the spot size is made, it is likely that the step size will be underestimated. A feature smaller than the spot size may still be measured by generating calibration data to predict the underestimation of the step size as a function of the spot size and feature size.

There is an optimum pinhole size to provide the optimum vertical resolution. This is a complex function of many parameters associated with the hardware such as wavelength and lens geometry and may be readily determined by one of ordinary skill in the art.

The detector output voltages are proportional to the intensities of the signals intercepting the detectors. Thus, for example, as the objective lens 132 is scanned by driver 134 in FIG. 4, the detector signals vary in intensity. At the position of the objective lens 132 where the focal plane for one light beam, i.e., having wavelength 633 nm, coincides with the surface of the sample, the output signal for one detector, e.g., detector 150 is maximized. At the position of the objective lens 132 where the focal plane for the other light beam, i.e., having wavelength 670 nm, coincides with the surface of the sample, the output signal for the other detector, e.g., detector 151, is maximized. If the surface of the sample is flat and the beams are orthogonal, the two positions of the objective lens 132 will typically not be the same for maximum output of the detectors 150, 151 for two reasons. The first reason will be due to the slight difference in the positions of the focal plane for the two wavelengths. This objective lens height positional difference will be called the wavelength offset ($z_{wo}$). Of course, where only one light source is used as described in FIG. 7, there will be no wavelength offset $z_{wo}$. The second reason will be due to the alignment error associated with the positions of the two pinholes 146, 147 with respect to the objective lens 132, i.e., all three will not be exactly confocal. This alignment error difference between the two pinholes 146, 147 will be called the alignment offset ($z_{ao}$). If the surface of the sample is not flat and one spot resides on the top of a step and the other spot resides on the bottom of a step, the two positions will vary by the size of the step, the wavelength offset $z_{wo}$ and the alignment offset $z_{ao}$.

The hardware can be easily modified so that in addition to the two spot confocal displacement hardware, the differential confocal hardware and procedure described in "The Optical Probe Using Differential Confocal Technique for Surface Profile" by Wang, Fusheng, Tan, Jiubin and Zhao, Weiquan in Process Control and Inspection for Industry, Shulian, Wei Gao, Editors, Proceedings of SPIE vol. 4222 (2000), can be implemented.

Figure 10:
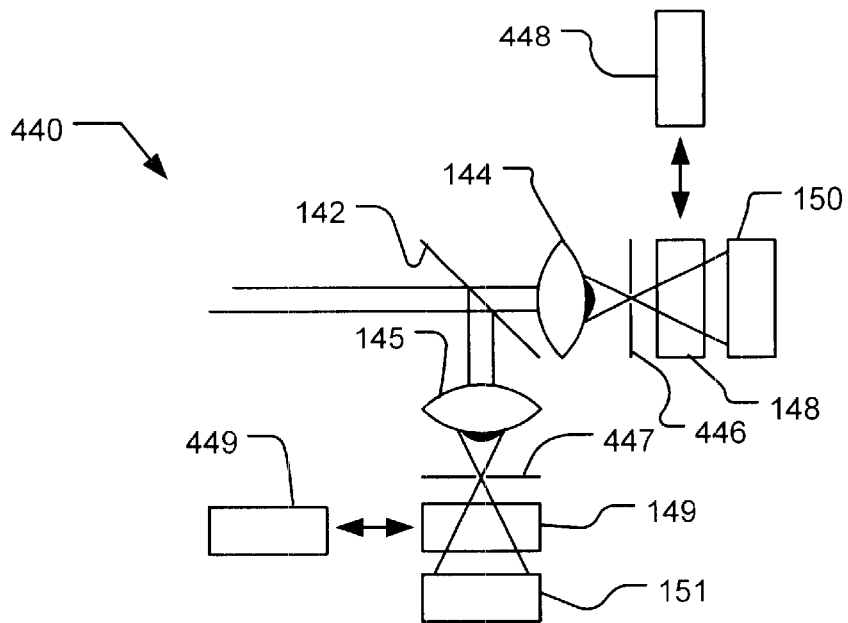
FIG. 10 is a block diagram of another embodiment of the detector leg.

FIG. 10 is a block diagram of the detector leg 440 in which the Wang, Tan, and Zhao hardware can be implemented. It is preferable to use the configuration in FIG. 4 with a coincident beam exiting beamsplitter 118 and some form of polarizing beam separation component so that the reflected signal transmitted and reflected from beamsplitter 142 is properly aligned with pinholes 146 and 147 for both wavelengths. If the two beams exiting beamsplitter 118 were not coincident, a pinhole could only be aligned properly for one of the two wavelengths.

As shown in FIG. 10, detector leg 440 includes two movable sets of filters. Filter 148 can be switched with filter 448, and filter 149 can be switched with filter 449. The sets of filters include filters for both wavelengths, thus, either a 633 nm or 670 nm filter could be inserted in the optical path in front of detector 150 and in front of detector 151. The sets of filters can be side-by-side filters that linearly translate between the two positions, two filters that rotate between the two positions or a circular filter with two different areas that can rotate between the two positions. Pinhole 146 is then set to a specific position slightly ahead of the confocal plane while pinhole 147 is set to the same specific position slightly behind the confocal plane. These offsets would be included in the alignment offset $z_{ao}$ and would not cause additional errors in the dual wavelength, two spot confocal displacement procedures. When the filters in the optical path in front of the detectors are for the same wavelength, the Wang, Tan, and Zhao hardware is implemented. Thus, for example, if the filters are 670 nm filters, only the 670 nm spot is analyzed using the differential confocal technique. When both filters are 633 nm filters, only the 633 nm spot is analyzed using the differential confocal technique. However, when the filters are for different wavelengths, both spots are analyzed in accordance with the two spot confocal displacement procedures.

Unlike a single spot displacement sensor, the method of measuring the height of a surface for a given measurement position is determined from the intensity versus objective lens position curve for both spots for two or more measurement locations, in accordance with the present invention. The metrology module may be held constant while the stage holding the sample is translated or vice versa. The difference in height between the two spots is then calculated for each measurement location. This differential height is then used to construct the difference in height versus measurement position profile. Advantageously, it is not be necessary to execute a calibration procedure to determine the wavelength offset and alignment offset of the dual spot displacement sensor.

Any noise source such as mechanical vibrations or power supply noise will distort both detector intensity versus objective lens position curves. If the peak positions for the two curves coincide in time (along with the objective lens position), the noise will essentially be rejected because the noise will affect both curves equally. Unfortunately, most of the time, the peaks of these curves will occur at slightly different times for the two spots. Therefore, the noise will affect each curve in a slightly different manner and there will not be true differential noise rejection. On the other hand for example, if the mechanical vibration frequency is significantly lower than the frequency of measurement, a significant amount of the mechanical noise will be eliminated by the differential measurement. A typical mechanical noise frequency is in the range of 15 to 20 Hz while a typical measurement frequency might be 1000 Hz, and thus, the noise should be significantly rejected due to the differential measurement technique. If the noise frequency is comparable to the measurement frequency, little noise rejection will be realized. If the noise frequency is significantly greater than the measurement frequency, some noise rejection will again be realized. The differential nature of the measurement will result in a varying degree of noise rejection for a host of noise sources depending on the noise and measurement frequency providing a noise rejection improvement over a standard laser confocal displacement sensor.

If desired, the contribution of mechanical noise or vertical stage error can be quantified. This may be performed by determining a height profile using the data from both points and both detectors. Then a height profile from only one of the two points and one detector is determined. The single point height profile is then leveled. The subtraction of the two spot height profile from the leveled single point height profile yields the mechanical noise and vertical stage errors as a function of measurement position.

Figure 11A:
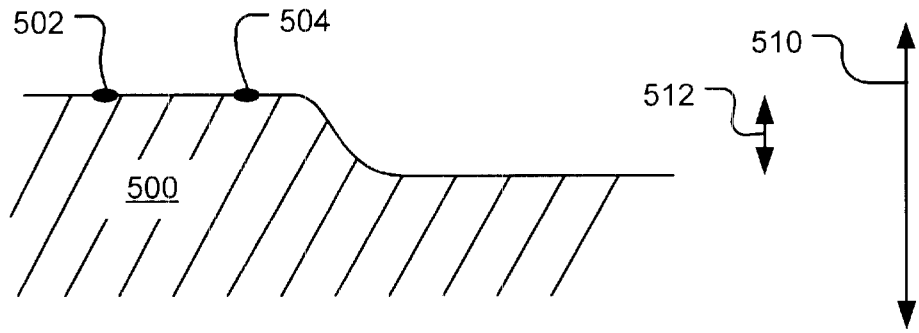
FIG. 11A shows two spots on a sample surface.

To make a simple two-point measurement, the two spots 502 and 504 from the displacement sensor are located on a flat part of the sample 500 as shown in FIG. 11A. The two spots 502, 504 can be, e.g., of different wavelengths, as described in reference to FIGS. 4 and 6 or the same wavelength as described in FIG. 7. The choice of spacing of the two spots 502, 504 should take into account the height of the step and sidewall angle of the step. Advantageously, tilt of the sample 500 will not affect the measurement.

Figure 12:
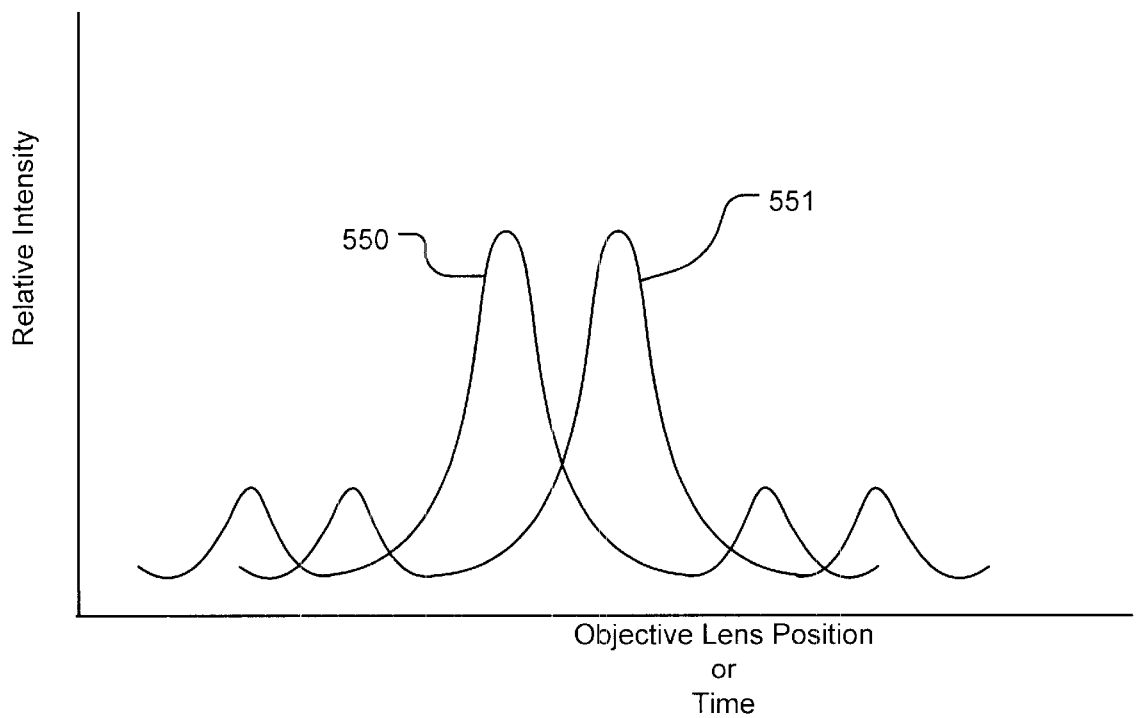
FIG. 12 illustrates the output signals from the two detectors as a function of the position of the objective lens for each spot or the time.

The objective lens driver 134 moves the objective lens 132 from FIG. 4 over a range illustrated by arrow 510 that exceeds the expected step height illustrated by arrow 512 by some fraction. Of course, as described in reference to FIG. 6, the detector lenses or pinholes may be moved over a range instead of the objective lens. The output signals from the two detectors 150, 151 and the position of the objective lens 132 are recorded as a function of time or objective lens position, as illustrated in FIG. 12. As can be seen in FIG. 12, the output signal 550 from detector 150 reaches a maximum intensity at a different time and objective lens position than the output signal 551 from detector 151. The resultant curve of the detector voltage versus objective lens position has the shape of a $(\sin x/x)_2$ curve, illustrated in FIG. 2. The same curve for sensor 600 shown in FIG. 8C is illustrated in FIG. 8D.

The position of the objective lens at the maximum intensity is determined by mathematical means. This can be done in numerous ways such as simply taking the position of maximum intensity or fitting a curve to the detector data points and taking the maximum from the fitted curve. The position of the objective lens at the maximum intensity is determined for both spots 502 and 504 and is referred to as $(z_{0,\ 502})$ and $(z_{0,\ 504})$, respectively. The position of the objective lens represents the height of the sample surface at the location of the spot. The two heights are then subtracted from each other to yield the height difference on the sample surface at the locations intercepted by the two beams ($z_{0,\ 502} - z_{0,\ 504} = z_0$). Actually, the height difference $z_0$ is the height difference between the two spots minus the wavelength offset $z_{wo}$ and alignment offset $z_{ao}$. If the beam was perfectly orthogonal to the sample and the sample was perfectly flat, the height difference $z_0$ would be zero once the wavelength offset $z_{wo}$ and alignment offset $z_{ao}$ are accounted for. However, as discussed above, there is no need to calibrate or correct for the wavelength offset $z_{wo}$ and alignment offset $z_{ao}$. Moreover, if the beam was slightly inclined to the surface of the sample, the height difference $z_0$ will not be equal to zero once the wavelength offset $z_{wo}$ and alignment offset $z_{ao}$ are accounted for, but again, there is no need to calibrate or correct for tilt in the present invention.

Figure 11B:
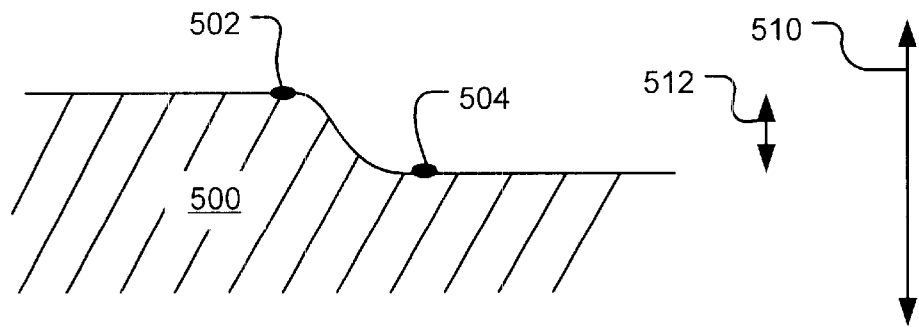
FIG. 11B shows two spots at a different location on a sample surface.

The sample is then re-positioned along the vector defined by the two spots 502, 504 so that one spot 502 intercepts an upper part of the step and the second spot 504 intercepts a lower part of the step as shown in FIG. 11B. The spot orientation must be properly chosen to meet this requirement. The same procedure discussed above is executed and the difference of the two beam heights is calculated ($z_{1,\ 502} - z_{1,\ 504} = z_1$). The two height differences are then subtracted to yield the step height $z_{step}$ ($z_1 - z_0 = z_{step}$). Since the wavelength offset $z_{wo}$ and alignment offset $z_{ao}$ affect both $z_0$ and $z_1$ by approximately the same amount, the wavelength offset $z_{wo}$ and alignment offset $z_{ao}$ do not need to be subtracted from these two terms to yield the correct answer. Therefore, a calibration procedure to determine the wavelength offset $z_{wo}$ and alignment offset $z_{ao}$ is not required. Moreover, any tilting of the sample with respect to the beam modifies both values $z_0$ and $z_1$ approximately equally, hence tilting is inconsequential to the step height calculation. This procedure may be performed for the dual wavelength embodiments of FIGS. 4 and 6 and the single wavelength embodiment of FIG. 7.

To make a referential line scan, one spot is scanned in a region of constant height (the reference spot) while the second spot is scanned across the feature to be measured (the measurement spot). The two spots can be oriented in any manner with respect to the scan direction and placed any distance apart as long as they satisfy the above criteria. Any variation in the slope of the height of the reference region with respect to the measurement region during the scan will result in a measurement error. A constant positive, constant negative or zero slope of the reference and measurement regions during the scan is acceptable and will not cause any tilting errors. The difference in height between the two points for each measurement position is recorded to directly generate the actual height profile (no integration required).

To make a differential line scan, the above procedure is repeated a number of times with the two spots 502, 504 traversing the same path with one spot following the other. Typically, the two spots are positioned closely together. For example, the distance between the two spots may be chosen to be two times the spot diameter. The spacing between measurement locations (not the spots) determines the lateral resolution of the resultant height profile. When the spacing between measurement locations is comparable to the spot size, the maximum lateral resolution is attained. The resultant profile from all of the calculated height differences is the slope of the actual height profile. If the sample is tilted with respect to the measurement beam, the slope profile starts off at a value not equal to zero. If this offset value is subtracted from all of the subsequent values of the slope profile, this would be equivalent to a slope profile made with the measurement beam exactly orthogonal to the sample surface and the compensation of the wavelength offset $z_{wo}$ and alignment offset $z_{ao}$. The integration of this slope profile (whose first point starts at zero height) yields the actual height profile of the scan.

To make a referential area scan, the referential line scan procedure is repeated many times after appropriately shifting the two spots orthogonal to the line scan direction. Practically, this may be difficult since it requires the reference region to cover an area comparable in size to the area to be measured and have a constant slope. The height profiles from the line scans are assembled to yield an area height profile.

To make a differential area scan, the differential line scan procedure is repeated many times, similar to a rastering scan. The height profiles from the line scans are assembled to yield an area height profile. This is the preferred area scan procedure.

The shape of the intensity versus objective lens position will be modified if a transparent material is present on the surface of the sample. Each underlying interface will produce a local maximum when the focal plane of the objective coincides with this interface. The thickness of these layers can be determined with the additional knowledge of the indices of refraction of the film materials. The index of refraction is required since the beam is refracted by the film to modify the confocal configuration between the objective lens and pinhole. Due to interference effects, it is possible for the intensity associated with each of these peaks to significantly vary with respect to each other for different sample configurations.

Another problem may arise with the presence of one or more transparent films on the surface of a sample when utilizing any form of a laser confocal displacement sensor. For certain specific combinations of source wavelength, indices of refraction and film stack thicknesses, the total reflected intensity of the signal may be small enough to create signal to noise problems that could compromise the precision capability of the tool. If this occurs, it is possible to analyze only the second wavelength and utilize the data in a similar manner to a standard laser confocal displacement sensor. The probability of encountering this problem is reduced compared to a standard laser confocal displacement sensor due to the presence of a second wavelength.

Although the present invention is illustrated in connection with specific embodiments for instructional purposes, the present invention is not limited thereto. Various adaptations and modifications may be made without departing from the scope of the invention. For example, various embodiments may be combined to practice the present invention. Moreover, additional or different optical components, such as beam expanders or lenses, may be used. In addition, it should be understood that a system of lenses may be used in place of a single lens and vice versa. Therefore, the spirit and scope of the appended claims should not be limited to the foregoing description.

What is claimed is:

1. An apparatus for measuring the surface profile of a sample, said apparatus comprising:
   at least one light source;
   means for producing a first light beam and a second light beam;
   an objective lens for focusing said first light beam at a first spot on the surface of said sample and for focusing said second light beam at a second spot on the surface of said sample, said first light beam and said second light beam being reflected by the surface of said sample;
   a detector leg receiving the reflected first light beam and the reflected second light beam, said detector leg comprising:
      at least one detector lens;
      at least a first pinhole in the optical path of at least one of said reflected first light beam and said reflected second light beam;
      at least a first detector for receiving at least one of said reflected first light beam and said reflected second light beam after passing through said first pinhole; and
   at least one driver coupled to at least one of the optical components consisting essentially of said objective lens, said at least one detector lens, and said at least a first pinhole, said at least one driver scans the component said driver is coupled to over a range of positions, wherein within said range said objective lens, said at least one detector lens, and said at least a first pinhole are confocal.

2. The apparatus of claim 1, wherein said detector leg further comprises:
   said first pinhole in the optical path of said reflected first light beam;
   said first detector for receiving said reflected first light beam after passing through said first pinhole;
   a second pinhole in the optical path of said reflected second light beam;
   a second detector for receiving said reflected second light beam after passing through said second pinhole; and
   wherein said at least one driver is coupled to at least one of the optical components consisting essentially of said objective lens, said at least one detector lens, and said first pinhole and said second pinhole, said at least one driver scans the component said driver is coupled to over a range of positions, wherein within said range said objective lens, said at least one detector lens, and said first pinhole and said second pinhole are confocal.

3. The apparatus of claim 2, wherein said detector leg further comprises:
   a beamsplitter that receives said reflected first light beam and said reflected second light beam and directs said reflected first light beam to said first pinhole and said reflected second light beam to said second pinhole.

4. The apparatus of claim 3, wherein said detector leg further comprises:
   a first wavelength filter disposed between said beamsplitter and said first detector; and
   a second wavelength filter disposed between said beamsplitter and said second detector.

5. The apparatus of claim 3, wherein said at least one detector lens comprises a first detector lens disposed between said beamsplitter and said pinhole and a second detector lens disposed between said beamsplitter and said second pinhole.

6. The apparatus of claim 3, wherein said at least one detector lens comprises a detector lens disposed before said beamsplitter so that said detector lens receives said reflected first light beam and said reflected second light beam prior to said beamsplitter.

7. The apparatus of claim 1, wherein said at least one driver is coupled to said objective lens.

8. The apparatus of claim 2, wherein said at least one detector lens is a first detector lens and a second detector lens, and said at least one driver is a first driver coupled to said first detector lens and a second driver coupled to said second detector, wherein said first driver moves said first detector lens and said second driver moves said second detector lens.

9. The apparatus of claim 2, wherein said at least one driver is a first driver coupled to said first pinhole and a second driver coupled to said second pinhole, wherein said first driver moves said first pinhole and said second driver moves said second pinhole.

10. The apparatus of claim 1, further comprising:
at least one of a K-mirror and a dove prism disposed between said means for producing a first light beam and a second light beam and said objective lens, said at least one of a K-mirror and a dove prism altering the orientation of said first light beam and said second light beam.

11. The apparatus of claim 1, further comprising:
a set of switchable prisms, including a first prism and a second prism having optical axes that are oriented 90 degrees with respect to each other, wherein said first prism and said second prism are switchably disposed between said means for producing a first light beam and a second light beam and said objective lens, said set of switchable prisms altering the orientation of said first light beam and said second light beam.

12. The apparatus of claim 1, further comprising:
a prism that receives said first light beam and said second light beam and produces said first light beam and said second light beam; and
a driver coupled to said prism, said driver moves said prism to vary the lateral distance between said first light beam and said second light beam when incident on said sample.

13. The apparatus of claim 1, wherein said at least one light source is a first light source producing said first light beam and a second light source producing said second light beam, said apparatus further comprising:
a first beamsplitter receiving said first light beam from said first light source and said second light beam from said second light source and producing a single, coincident beam; and
said means for producing a first light beam and a second light beam comprises a prism receiving said single, coincident beam and producing said first light beam and said second light beam.

14. The apparatus of claim 13, further comprising a second beamsplitter disposed between said prism and said first beamsplitter, wherein said prism receives said reflected first light beam and said reflected second light beam and produces a coincident reflected light beam including said reflected first light beam and said reflected second light beam, said second beamsplitter directing said coincident reflected light beam to said detector leg.

15. The apparatus of claim 13, wherein said light beam from said first light source has a first wavelength and said light beam from said second light source has a second wavelength and said prism produces said first light beam with said first wavelength and said second light beam with said second wavelength.

16. The apparatus of claim 1, wherein:
said at least one light source is a first light source producing said first light beam and a second light source producing said second light beam; and
said means for producing a first light beam and a second light comprises said first light source and said second light source being located to produce non-parallel beams.

17. The apparatus of claim 1, wherein:
said at least one light source is a light source producing one light beam; and
said means for producing a first light beam and a second light comprises a prism receiving said one light beam and producing said first light beam and said second light beam.

18. The apparatus of claim 1, said apparatus further comprising a computer system coupled to said first detector and said second detector, said computer system having a computer-usable medium having computer-readable program code embodied therein for:
correlating and recording the intensities recorded by said first detector and said second detector over said range of positions;
calculating the height difference between said first spot and said second spot;
determining the maximum intensity detected by said first detector and said second detector over said range of positions which represents the height of the surface of said sample at said first spot and said second spot; and
calculating the first height difference between the height of the surface of said sample at said first spot and said second spot.

19. The apparatus of claim 1, wherein said at least one detector lens has an opaque center.

20. An apparatus for measuring the surface profile of a sample, said apparatus comprising:
a first light source producing a first light beam;
a second light source producing a second light beam;
an objective lens for focusing said first light beam at a first spot on the surface of said sample and for focusing said second light beam at a second spot on the surface of said sample, said first light beam and said second light beam being reflected by the surface of said sample;
a detector leg receiving the reflected first light beam and the reflected second light beam, said detector leg comprising:
at least one detector lens;
a first pinhole in the optical path of said reflected first light beam;
a first detector for receiving said reflected first light beam after passing through said first pinhole;
a second pinhole in the optical path of said reflected second light beam;
a second detector for receiving said reflected second light beam after passing through said second pinhole; and
at least one driver coupled to at least one of the optical components consisting essentially of said objective lens, said at least one detector lens, and said first pinhole and said second pinhole, said at least one driver scans the component said driver is coupled to over a range of positions, wherein within said range said objective lens, said at least one detector lens, and said first pinhole and said second pinhole are confocal.

21. The apparatus of claim 20, wherein said detector leg further comprises:
a beamsplitter that receives said reflected first light beam and said reflected second light beam and directs said reflected first light beam to said first pinhole and said reflected second light beam to said second pinhole.

22. The apparatus of claim 21, wherein said detector leg further comprises:
a first wavelength filter disposed between said beamsplitter and said first detector; and
a second wavelength filter disposed between said beamsplitter and said second detector.

23. The apparatus of claim 21, wherein said at least one detector lens comprises a first detector lens disposed between said beamsplitter and said pinhole and a second detector lens disposed between said beamsplitter and said second pinhole.

24. The apparatus of claim 20, wherein said at least one detector lens comprises a detector lens disposed before said beamsplitter so that said detector lens receives said reflected first light beam and said reflected second light beam prior to said beamsplitter.

25. The apparatus of claim 20, wherein said at least one driver is coupled to said objective lens.

26. The apparatus of claim 20, wherein said at least one detector lens is a first detector lens and a second detector lens, and said at least one driver is a first driver coupled to said first detector lens and a second driver coupled to said second detector, wherein said first driver moves said first detector lens and said second driver moves said second detector lens.

27. The apparatus of claim 20, wherein said at least one driver is a first driver coupled to said first pinhole and a second driver coupled to said second pinhole, wherein said first driver moves said first pinhole and said second driver moves said second pinhole.

28. The apparatus of claim 20, further comprising:
a prism that receives said first light beam and said second light beam and produces said first light beam and said second light beam; and
a driver coupled to said prism, said driver moves said prism to vary the lateral distance between said first light beam and said second light beam when incident on said sample.

29. The apparatus of claim 20, further comprising:
a first beamsplitter receiving said first light beam and said second light beam and producing a single, coincident beam; and
a prism receiving said single, coincident beam and producing said first light beam and said second light beam.

30. The apparatus of claim 29, further comprising a second beamsplitter disposed between said prism and said first beamsplitter, wherein said prism receives said reflected first light beam and said reflected second light beam and produces a coincident reflected light beam including said reflected first light beam and said reflected second light beam, said second beamsplitter directing said coincident reflected light beam to said detector leg.

31. The apparatus of claim 29, wherein said light beam from said first light source has a first wavelength and said light beam from said second light source has a second wavelength and said prism produces said first light beam with said first wavelength and said second light beam with said second wavelength.

32. The apparatus of claim 20, wherein said first light source and said second light source are located to produce non-parallel beams.

33. The apparatus of claim 20, said apparatus further comprising a computer system coupled to said first detector and said second detector, said computer system having a computer-usable medium having computer-readable program code embodied therein for:
correlating and recording the intensities recorded by said first detector and said second detector over said range of positions;
calculating the height difference between said first spot and said second spot;
determining the maximum intensity detected by said first detector and said second detector over said range of positions which represents the height of the surface of said sample at said first spot and said second spot; and
calculating the first height difference between the height of the surface of said sample at said first spot and said second spot.

34. The apparatus of claim 20, wherein said at least one detector lens has an opaque center.

35. An apparatus for measuring the surface profile of a sample, said apparatus comprising:
at least one light source producing a light beam;
a first prism that receives said light beam and produces a first light beam and a second light beam;
an objective lens for focusing said first light beam at a first spot on the surface of said sample and for focusing said second light beam at a second spot on the surface of said sample, said first light beam and said second light beam being reflected by the surface of said sample;
a detector leg receiving the reflected first light beam and the reflected second light beam, said detector leg comprising:
at least one detector lens;
at least a first pinhole in the optical path of at least one of said reflected first light beam and said reflected second light beam;
at least a first detector for receiving at least one of said reflected first light beam and said reflected second light beam after passing through said first pinhole; and
at least one driver coupled to at least one of the optical components consisting essentially of said objective lens, said at least one detector lens, and said at least a first pinhole, said at least one driver scans the component said driver is coupled to over a range of positions, wherein within said range said objective lens, said at least one detector lens, and said at least a first pinhole are confocal.

36. The apparatus of claim 35, wherein said detector leg further comprises:
said first pinhole in the optical path of said reflected first light beam;
said first detector for receiving said reflected first light beam after passing through said first pinhole;
a second pinhole in the optical path of said reflected second light beam;
a second detector for receiving said reflected second light beam after passing through said second pinhole; and wherein said at least one driver is coupled to at least one of the optical components consisting essentially of said objective lens, said at least one detector lens, and said first pinhole and said second pinhole, said at least one driver scans the component said driver is coupled to over a range of positions, wherein within said range said objective lens, said at least one detector lens, and said first pinhole and said second pinhole are confocal.

37. The apparatus of claim 36, wherein said detector leg further comprises:

a beamsplitter that receives said reflected first light beam and said reflected second light beam and directs said reflected first light beam to said first pinhole and said reflected light beam to said second pinhole.

38. The apparatus of claim 37, wherein said at least one detector lens comprises a first detector lens disposed between said beamsplitter and said pinhole and a second detector lens disposed between said beamsplitter and said second pinhole.

39. The apparatus of claim 37, wherein said at least one detector lens comprises a detector lens disposed before said beamsplitter so that said detector lens receives said reflected first light beam and said reflected second light beam prior to said beamsplitter.

40. The apparatus of claim 35, wherein said at least one driver is coupled to said objective lens.

41. The apparatus of claim 36, wherein said at least one detector lens is a first detector lens and a second detector lens, and said at least one driver is a first driver coupled to said first detector lens and a second driver coupled to said second detector, wherein said first driver moves said first detector lens and said second driver moves said second detector lens.

42. The apparatus of claim 36, wherein said at least one driver is a first driver coupled to said first pinhole and a second driver coupled to said second pinhole, wherein said first driver moves said first pinhole and said second driver moves said second pinhole.

43. The apparatus of claim 35, further comprising:

a second prism that receives said first light beam and said second light beam and produces said first light beam and said second light beam; and a driver coupled to said second prism, said driver moves said second prism to vary the lateral distance between said first light beam and said second light beam when incident on said sample.

44. The apparatus of claim 35, wherein said at least one light source is a first light source producing said first light beam and a second light source producing said second light beam, said apparatus further comprising:

a first beamsplitter receiving said first light beam from said first light source and said second light beam from said second light source and producing a single, coincident beam; and said first prism receiving said single, coincident beam and producing said first light beam and said second light beam.

45. The apparatus of claim 44, further comprising a second beamsplitter disposed between said first prism and said first beamsplitter, wherein said first prism receives said reflected first light beam and said reflected second light beam and produces a coincident reflected light beam including said reflected first light beam and said reflected second light beam, said second beamsplitter directing said coincident reflected light beam to said detector leg.

46. The apparatus of claim 44, wherein said light beam from said first light source has a first wavelength and said light beam from said second light source has a second wavelength and said first prism produces said first light beam with said first wavelength and said second light beam with said second wavelength.

47. The apparatus of claim 35, wherein:

said at least one light source is a light source producing one light beam; and said first prism receiving said one light beam and producing said first light beam and said second light beam.

48. The apparatus of claim 35, said apparatus further comprising a computer system coupled to said first detector and said second detector, said computer system having a computer-usable medium having computer-readable program code embodied therein for:

correlating and recording the intensities recorded by said first detector and said second detector over said range of positions;

calculating the height difference between said first spot and said second spot;

determining the maximum intensity detected by said first detector and said second detector over said range of positions which represents the height of the surface of said sample at said first spot and said second spot; and calculating the first height difference between the height of the surface of said sample at said first spot and said second spot.

49. The apparatus of claim 35, wherein said at least one detector lens has an opaque center.

50. A method of measuring the surface profile of a sample, said method comprising:

producing a first light beam and a second light beam;

focusing said first light beam and said second light beam onto the surface of said sample with an objective lens so that said first light beam and said second light beam are reflected off the surface of said sample;

focusing the first light beam and said second light beam onto at least a first detector through at least a first pinhole;

varying the focal plane of said objective lens with respect to said at least a first pinhole over a range, wherein said objective lens is confocal with said at least a first pinhole within said range; and determining the maximum intensity detected by said at least a first detector as the focal plane of said objective lens is varied with respect to said at least a first pinhole over said range which represents the height of the surface of said sample where said first light beam and said second light beam are incident on said surface; and calculating a first height difference between the height of the surface of said sample where said first light beam and said second light beam are incident on said surface based on the maximum intensity detected by said first detector and said second detector.

51. The method of claim 50, wherein focusing the first light beam and said second light beam onto at least a first detector through at least a first pinhole comprises:

focusing the first light beam onto a first detector through a first pinhole; and focusing the second light beam onto a second detector through a second pinhole.

52. The method of claim 50, wherein producing a first light beam and a second light beam comprises using a prism to separate said first light beam and said second light beam from a single light beam.

53. The method of claim 52, wherein producing a first light beam and a second light beam further comprises:

producing a first light beam from a first light source and a second light beam from a second light source; and producing said single light beam which includes said first light beam coincident with said second light beam.

54. The method of claim 52, wherein producing a first light beam and a second light beam further comprises producing a single light beam from a light source.

55. The method of claim 50, wherein producing a first light beam and a second light beam comprises producing a first light beam from a first light source and a second light beam from a second light source, wherein said first light beam and said second light beam are not coincident.

56. The method of claim 50, further comprising:

repositioning said sample with respect to said first light beam and said second light beam;

performing the acts of focusing said first light beam and said second light beam onto the surface of said repositioned sample; focusing the first light beam onto a first detector through a first pinhole; focusing the second light beam onto a second detector through a second pinhole; and varying the focal plane of said objective lens with respect to said first pinhole and said second pinhole over a range, wherein said objective lens is confocal with said first pinhole and said second pinhole within said range;

determining the maximum intensity detected by said first detector and said second detector as the focal plane of said objective lens is varied with respect to said first pinhole and said second pinhole over said range which represents the height of the surface of said repositioned sample where said first light beam and said second light beam are incident on said surface;

calculating a second height difference between the height of the surface of said repositioned sample where said first light beam and said second light beam are incident on said surface based on the maximum intensity detected by said first detector and said second detector; and calculating the difference between said first height difference and said second height difference to determine the surface profile of said sample.

57. The method of claim 56, wherein said sample is repositioned along a vector parallel to the vector between the location said first light beam and said second light beam are incident on said surface.

58. The method of claim 56, wherein said sample is repositioned along a vector non-parallel to the vector between the location said first light beam and said second light beam are incident on said surface.

59. The method of claim 56, wherein said acts are repeated for a plurality of locations on said sample.

60. The method of claim 51, further comprising:

using the intensity detected by one of said first detector and said second detector to determine the material on said sample that one of the corresponding first light beam and second light beam is incident on.

61. The method of claim 51, further comprising:

using the intensity detected by one of said first detector and said second detector to determine if one of the corresponding first light beam and second light beam is incident on one or more materials.

62. The method of claim 51, further comprising:

obscuring at least a portion of said first light beam prior to said first light beam being incident on said first detector; and obscuring at least a portion of said second light beam prior to said second light beam being incident on said second detector.

* * * * *